US012596017B2

(12) United States Patent
Denis et al.

(10) Patent No.: US 12,596,017 B2
(45) Date of Patent: Apr. 7, 2026

(54) MAGNETIC POSITION SENSOR SYSTEM, DEVICE AND METHOD

(71) Applicant: Melexis Technologies SA, Bevaix (CH)

(72) Inventors: Leon Denis, Brussels (BE); Adrian Munteanu, Brussels (BE); Illia Khvastunov, Tessenderlo (BE); Kristof Coddens, Tessenderlo (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 271 days.

(21) Appl. No.: 18/350,262

(22) Filed: Jul. 11, 2023

(65) Prior Publication Data

US 2024/0011798 A1 Jan. 11, 2024

Related U.S. Application Data

(63) Continuation of application No. PCT/EP2023/068953, filed on Jul. 8, 2023.

(30) Foreign Application Priority Data

Jul. 11, 2022 (EP) .................................... 22184121

(51) Int. Cl.
*G06F 3/0346* (2013.01)
*G01D 5/14* (2006.01)
(Continued)

(52) U.S. Cl.
CPC ............. *G01D 5/145* (2013.01); *G06N 3/044* (2023.01); *G06N 3/08* (2013.01)

(58) Field of Classification Search
CPC ............ G06N 3/044; G06N 3/08; G06N 3/04; G01D 5/145
See application file for complete search history.

(56) References Cited

U.S. PATENT DOCUMENTS

2007/0185825 A1* 8/2007 Ito .......................... G06N 20/00
706/30
2014/0275998 A1* 9/2014 Eichler .................. A61B 6/547
600/424
(Continued)

FOREIGN PATENT DOCUMENTS

CN 113008291 A 6/2021
DE 102015203686 A1 9/2016
(Continued)

OTHER PUBLICATIONS

Degree of Freedom in Deep Neural Networks, Gao et al. (Year: 2016).*

(Continued)

*Primary Examiner* — Alesa Allgood
(74) *Attorney, Agent, or Firm* — Workman Nydegger

(57) ABSTRACT

Method of determining a position (f a sensor device movable relative to a magnetic source, or vice versa; the sensor device comprising at least two magnetic sensors; the method comprising the steps of: a) obtaining a plurality of magnetic sensor signals from said magnetic sensors; b) determining or estimating the position of the sensor device based on said plurality of sensor signals or signals derived therefrom; wherein step b) comprises: determining said position (sing an artificial neural network; the artificial neural network being a recurrent neural network trained for determining said position using at most three hundred trainable parameters per degree of freedom. A position sensor system. A position sensor device.

20 Claims, 28 Drawing Sheets

| Number of Hall elements | Typical number of trainable parameters of GRU1 | MAE [mm] |
|---|---|---|
| 2x2=4 | 20 to 25, e.g. about 23 | about 0.02 to 0.08, depending on: |
| 3x3=9 | 30 to 40, e.g. about 35 | - the length of the time-series; |
| 4x4=16 | 45 to 65, e.g. about 56 | - the number of sensor elements; |
| 5x5=25 | 73 to 93, e.g. about 83 | - the die size |

(51) Int. Cl.
 *G06N 3/044* (2023.01)
 *G06N 3/08* (2023.01)

(56) References Cited

U.S. PATENT DOCUMENTS

| | | | |
|---|---|---|---|
| 2016/0086080 A1 | 3/2016 | Foong et al. | |
| 2018/0046901 A1 | 2/2018 | Xie et al. | |
| 2019/0079142 A1 | 3/2019 | Close et al. | |
| 2020/0368616 A1* | 11/2020 | Delamont | H04N 13/239 |
| 2022/0196379 A1* | 6/2022 | Heinz | G01D 5/16 |
| 2022/0314434 A1* | 10/2022 | Kranski | B25J 9/163 |

FOREIGN PATENT DOCUMENTS

| | | | | |
|---|---|---|---|---|
| EP | 3621091 A1 | | 3/2020 | |
| EP | 3885779 A1 | | 9/2021 | |
| EP | 4105768 A1 | | 12/2022 | |
| FR | 3090121 A1 | * | 6/2020 | G01R 33/07 |

OTHER PUBLICATIONS

Extended European Search Report from corresponding European Patent Application No. EP22184121.6, Dec. 19, 2022.

* cited by examiner sensor device 402a i) completely in sensor device,
ii) competely in external device
    (e.g. laptop, DSP, ECU, ...)
iii) partly inside sensor device
    and partly in external device

GRU 1

Input layer
e.g. 1x4

1 Hidden layer of
1 unit

Output layer
1x1

1110

| Number of Hall elements | Typical number of trainable parameters of GRU1 | MAE [mm] |
|---|---|---|
| 2x2=4 | 20 to 25, e.g. about 23 | about 0.02 to 0.08, depending on: |
| 3x3=9 | 30 to 40, e.g. about 35 | - the length of the time-series; |
| 4x4=16 | 45 to 65, e.g. about 56 | - the number of sensor elements; |
| 5x5=25 | 73 to 93, e.g. about 83 | - the die size |

GRU 1,1

Input

GRU

GRU pred_x

Input layer
e.g. 1x4

2 Hidden layers
of 1 unit

Output layer
1x1

1310

| Number of Hall elements | GRU configuration | #paras (for DoF=1) |
|---|---|---|
| 2x2=4 | GRU 1,1 | 35 |
| 3x3=9 | GRU 1,1 | 50 |
| 4x4=16 | GRU 1,1 | 71 |

GRU 2

1410

| Number of Hall elements | GRU configuration | #paras (for DoF=1) |
|---|---|---|
| 2x2=4 | GRU 2 | 51 |
| 3x3=9 | GRU 2 | 81 |
| 4x4=16 | GRU 2 | 123 |

GRU 2, 2

1510

| Number of Hall elements | GRU configuration | #paras (for DoF=1) |
|---|---|---|
| 2x2=4 | GRU 2,2 | 87 |
| 3x3=9 | GRU 2,2 | 117 |
| 4x4=16 | GRU 2,2 | 159 |

1601

1600

1602

GRU 2

Input

Input layer
e.g. 1x4

GRU

GRU pred_x pred_y

1 Hidden layer of
2 units

Output layer
1x2

1810

| Number of Hall elements | GRU configuration | #paras (for DoF=2) |
|---|---|---|
| 2x2=4 | GRU 2 | 54 |
| 3x3=9 | GRU 2 | 84 |
| 4x4=16 | GRU 2 | 126 |

GRU 2, 2

2010

| Number of Hall elements | GRU configuration | #paras (for DoF=2) |
|---|---|---|
| 2x2=4 | GRU 2,2 | 90 |
| 3x3=9 | GRU 2,2 | 120 |
| 4x4=16 | GRU 2,2 | 162 |

| Sensors | Topology | #paras | MSE pos in mm |
|---|---|---|---|
| 4x1 | 1 | 25 | 0.3073 |
| 4x1 | 2 | 54 | 0.2507 |
| 4x1 | 3 | 89 | 0.2629 |
| 4x1 | 4 | 130 | 0.3271 |
| 4x1 | 1,1 | 37 | 0.2915 |
| 4x1 | 2,2 | 90 | 0.2621 |
| 4x1 | 3,3 | 161 | 0.2365 |
| 4x1 | 4,4 | 250 | 0.3901 |

FIG. 21

| Sensors | Topology | #paras | MSE pos in mm |
|---|---|---|---|
| 2x2 | 1 | 25 | 0.2780 |
| 2x2 | 2 | 54 | 0.0143 |
| 2x2 | 3 | 89 | 0.0112 |
| 2x2 | 4 | 130 | 0.0081 |
| 2x2 | 1,1 | 37 | 0.2789 |
| 2x2 | 2,2 | 90 | 0.0091 |
| 2x2 | 3,3 | 161 | 0.0063 |
| 2x2 | 4,4 | 250 | 0.0046 |

FIG. 22

GRU 4,4,4

2310

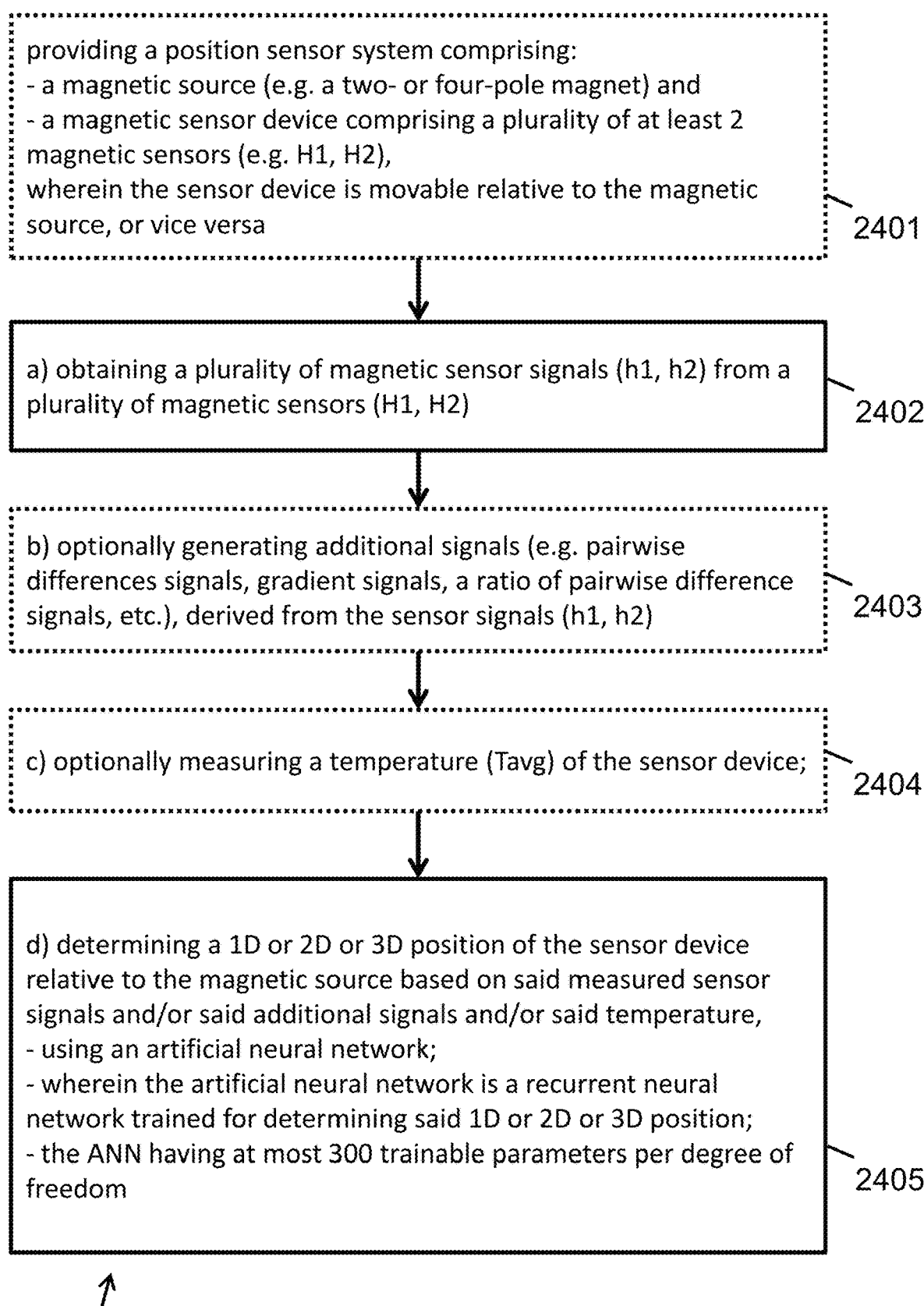

providing a position sensor system comprising:
- a magnetic source (e.g. a two- or four-pole magnet) and
- a magnetic sensor device comprising a plurality of at least 2 magnetic sensors (e.g. H1, H2),
wherein the sensor device is movable relative to the magnetic source, or vice versa

2401 a) obtaining a plurality of magnetic sensor signals (h1, h2) from a plurality of magnetic sensors (H1, H2)

2402 b) optionally generating additional signals (e.g. pairwise differences signals, gradient signals, a ratio of pairwise difference signals, etc.), derived from the sensor signals (h1, h2)

2403 c) optionally measuring a temperature (Tavg) of the sensor device;

2404 d) determining a 1D or 2D or 3D position of the sensor device relative to the magnetic source based on said measured sensor signals and/or said additional signals and/or said temperature,
- using an artificial neural network;
- wherein the artificial neural network is a recurrent neural network trained for determining said 1D or 2D or 3D position;
- the ANN having at most 300 trainable parameters per degree of freedom

| DOF=1 | | | |
|---|---|---|---|
| Architecture | Input parameters | MSE | std |
| GRU1 | 4 (4*Bz) | 0,0243 | 0,0129 |
| GRU1 | 5 (4*Bz, temp) | 0,0047 | 0,0029 |

| # input paras | Architecture | | | |
|---|---|---|---|---|
| | GRU1 | SRNN 1 | SRNN 2 | SRNN 3 |
| 5 (4*Bz, temp) | 26 | 9 | 19 | 31 |

FIG. 29

| DOF=1 | GRU1 | SRNN1 | SRNN2 | SRNN3 |
|---|---|---|---|---|
| MSE | 0,00817 | 0,04907 | 0,00127 | 0,00068 |

FIG. 30

| # input paras | Architecture | | | |
|---|---|---|---|---|
| | GRU 2 | SRNN 2 | SRNN 3 | SRNN 4 |
| 5 (4*Bz, temp) | 60 | 22 | 35 | 50 |
| 9 (4*By, 4*Bz, temp) | 84 | 30 | 47 | 66 |

FIG. 31

| DOF=2 | GRU2 | SRNN2 | SRNN3 | SRNN4 |
|---|---|---|---|---|
| MSE | 0,00851 | 0,03460 | 0,00832 | 0,00469 |

FIG. 32 input

*each ➔ represents a weight*

*each ÷ represents a bias*

Simple RNN          Fully - connected tanh          no activation

INPUT          OUTPUT 3 units

MAGNETIC POSITION SENSOR SYSTEM, DEVICE AND METHOD

FIELD OF THE INVENTION

The present invention relates in general to the field of magnetic sensor systems, devices and methods, and more in particular to position sensor systems wherein a sensor device is movable relative to a magnetic source, or vice versa.

BACKGROUND OF THE INVENTION

Magnetic sensors, e.g. current sensors, proximity sensors, position sensors, etc. are known in the art. They are based on measuring a magnetic field characteristic at one or multiple sensor locations. Depending on the application, the measured field characteristic(s) may be used to deduct another quantity, such as e.g. a current strength, proximity of a so called target, relative position of a sensor device to a magnet, etc.

Many variants of magnetic sensor devices, systems and methods exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc. Often two or more of these requirements conflict with each other, hence a trade-off needs to be made.

Many arrangements, and associated algorithms for determining a position based on signals obtained from magnetic sensors are known in the art.

Artificial Neural Networks are known, and many types of artificial neural networks exist. They are typically used for solving complex problems for which no simple mathematical formula exists, such as e.g. for image recognition, face recognition, voice recognition, handwriting recognition, computer translation, etc.

There is always room for improvements or alternatives.

SUMMARY OF THE INVENTION

It is an object of embodiments of the present invention to provide a method of determining a position of a sensor device which is movable relative to a magnetic source (e.g. a permanent magnet), or vice versa. The movement may have at most 1 or at most 2 or at most 3 degrees of freedom. The movement may for example be a pure translation (i.e. without a rotation) along a straight path or along a predefined curved path (1 degree of freedom), or a pure translation in a plane (2 degrees of freedom), or a pure translation in 3 dimensions, or a 1D rotation about a stationary axis (as can typically be made by a handle or a lever), or a 2D rotation about a stationary position (as can typically be made by a joystick).

It is also an object of embodiments of the present invention to provide a magnetic position system comprising a magnetic source (e.g. a permanent magnet), and a sensor device which is movable with 1 or 2 or 3 degrees of freedom relative to the magnetic source, or vice versa, wherein the system is configured for determining (or estimating) a position of the sensor device relative to the magnetic source.

It is also an object of embodiments of the present invention to provide a position sensor device for use in such a position sensor system, in case the proposed method is performed inside the position sensor device itself.

It is an object of embodiments of the present invention to provide such a system and method wherein the magnetic source is a relatively small permanent magnet, e.g. a magnet having an outer dimension (e.g. length or diameter) of at most 10 mm, or at most 8 mm, or at most 5 mm).

It is an object of embodiments of the present invention to provide such a system and method wherein the relative position can be determined with good accuracy in 1 or 2 or 3 directions, e.g. with a mean square error (MSE) smaller than ±100 micron, or smaller than ±50 micron, or smaller than ±20 micron for a measurement range from −2.5 mm to +2.5 mm; or e.g. with an absolute error or a mean square error smaller than 1% of the measurement range; or e.g. with an absolute error or a mean square error smaller than 1% of a largest outer dimension (e.g. largest of length, width, height) of the magnet.

It is an object of embodiments of the present invention to provide a relatively simple and lightweight system.

It is an object of embodiments of the present invention to provide such a system and method which is less sensitive to an external disturbance field, and/or which is less sensitive to temperature variations, and/or which is less sensitive to demagnetisation of the magnet, and/or is less sensitive to mounting errors (e.g. lateral offset and/or height offset in case of 1D movement, e.g. height offset in case of 2D movement), and preferably two or three or all of these characteristics.

It is an object of embodiments of the present invention to provide such a magnetic sensor system using only a single type of magnetic sensors, e.g. using only vertical Hall elements, or only horizontal Hall elements.

It is an object of particular embodiments of the present invention to provide such a magnetic sensor system having only four or from five to nine magnetic sensor elements, and wherein the sensor device is movable with 1 degree of freedom relative to a magnetic source, or vice versa.

It is an object of particular embodiments of the present invention to provide such a magnetic sensor system having only four or from five to nine magnetic sensor elements, and wherein the sensor device is movable with 2 degrees of freedom relative to a magnetic source, or vice versa.

It is an object of particular embodiments of the present invention to provide such a magnetic sensor system having only four or from five to sixteen magnetic sensor elements, and wherein the sensor device is movable with 3 degrees of freedom relative to a magnetic source, or vice versa.

It is an object of embodiments of the present invention to provide such a method and such a system for precise position determination in anti-counterfeiting applications, automotive applications, industrial applications, and/or robotic applications.

These and other objectives are accomplished by embodiments of the present invention.

According to a first aspect, the present invention provides a method of determining a position (e.g. x, or e.g. x, y, or e.g. gyp, xv) of a sensor device which is movable relative to a magnetic source with 1 or 2 or 3 degrees of freedom, or with only 1 or only 2 or only 3 degrees of freedom; the sensor device comprising a semiconductor substrate comprising a plurality of at least two magnetic sensors situated in at least two different locations; the method comprising the steps of: a) obtaining a plurality of sensor signals from said plurality of magnetic sensors; b) determining (or estimating) the position of the sensor device relative to the magnetic source based on said plurality of magnetic sensor signals and/or signals derived therefrom (e.g. pairwise difference signals, gradient signals, a ratio of pairwise difference signals, etc.); wherein step b) comprises: determining said position using an (e.g. a single) artificial neural network; wherein the artificial neural network is a recurrent neural network (RNN) having a predefined number (N) of trainable parameters, which are trained for determining said position; the number of trainable parameters being at most 300 per degree of freedom.

The artificial neural network typically comprises an input layer, one or more hidden layers, and an output layer, and is trained to minimize a "cost function", e.g. to minimize the mean square error (MSE) or the absolute error of a difference between the real (or ideal) position and the estimated (or predicted) position, over the training data set.

It is a major advantage of the present invention that it does not require the sensor elements to be arranged relative to the magnet in such a way as to provide quadrature signals.

The sensor device may be movable with only 1 degree of freedom (e.g. pure translation along a straight line or along a curved line, but no rotation), or may movable with only 2 degrees of freedom (e.g. pure translation in a plane, but no rotation), or may be movable with 3 degrees of freedom (e.g. pure translation in 3 directions, but no rotation).

It was quite surprising that the position accuracy obtainable by this method is surprisingly high, even when using a very simple neural network architecture (e.g. having only 1, or only 2, or only 3, or only 4 GRU-units) with a relatively low total number of parameters (e.g. less than 300 parameters per degree of freedom, or less than 250 trainable parameter per degree of freedom, or less than 200 trainable parameters per degree of freedom, or less than 150 trainable parameters per degree of freedom, or less than 100 trainable parameters per degree of freedom; or at most 900 or at most 800 at most 700 or at most 600 or at most 500 or at most 400 or at most 300 or at most 250 trainable parameters for a system with exactly 3 degrees of freedom; or at most 600 or at most 500 or at most 400 or at most 300 or at most 200 or at most 150 trainable parameters for a system with exactly 2 degrees of freedom; or at most 300 or at most 250 or at most 200 or at most 175 or at most 150 or at most 125 or at most 100 or at most 75 trainable parameters for a system with exactly 1 degree of freedom, even when taking into account one or more of the following: having a low or a reduced sensitivity to an external disturbance field (also known as "strayfield"), having a low or a reduced sensitivity to mounting tolerances (e.g. air-gap, lateral offset), having a low or reduced sensitivity to temperature variations.

Even more surprising was the fact that, the recurrent neural network (RNN) provides highly accurate results, even when the sensor device follows an arbitrary path at an arbitrary speed for which it was not explicitly trained. This offers the huge advantage that the neural network does not need to be trained with various specific movement paths or trajectories or profiles at various specific speeds, but excellent results can also be obtained when the network is trained with a relatively simple movement trajectory (or path or profile), for example a movement at a constant speed. It was found in particular that the position determination (or estimation) is still very good, even if the sensor device is actually moved (or moving) at a speed lower or higher than the speed at which the network was trained).

Preferably the size of the semiconductor substrate is at most 3.0 mm×3.0 mm, or at most 2.5 mm×2.5 mm, or at most 2.0 mm×2.0 mm, or at most 1.5 mm×1.5 mm, or at most 1.0 mm×1.0 mm.

Preferably the area of the semiconductor substrate is a value smaller than 9.0 $mm^2$, or smaller than 7.0 $mm^2$, or smaller than 4.0 $mm^2$, or smaller than 3.0 $mm^2$, or smaller than 2.5 $mm^2$, or smaller than 2.0 $mm^2$, or smaller than 1.5 $mm^2$, or smaller than 1.0 $mm^2$.

Preferably the largest distance between the two sensor elements which are farthest apart is a value in the range from 1.0 to 4.5 mm, or in the range from 1.5 to 3.0 mm, or in the range from 1.5 mm to 2.5 mm, or in the range from 1.0 mm to 2.0 mm.

In an embodiment, the sensor device is movable relative to the magnetic source with only 1 degree of freedom, and the artificial neural network (ANN) is a "simple recurrent network" (SRN) or a "simple recurrent neural network" (SRNN) having at most 300 trainable parameters, or at most 250, or at most 200, or at most 150, or at most 100, or at most 50 trainable parameters, e.g. as illustrated in FIG. 29.

In an embodiment, the sensor device is movable relative to the magnetic source with only 2 degrees of freedom, and the artificial neural network (ANN) is a "simple recurrent network" (SRN) or a "simple recurrent neural network" (SRNN) having at most 600 trainable parameters, or at most 500, or at most 400, or at most 300, or at most 250, or at most 200, or at most 150, or at most 100, or at most 50 trainable parameters, e.g. as illustrated in FIG. 31.

In an embodiment, the sensor device is movable relative to the magnetic source with only 3 degrees of freedom, and the artificial neural network (ANN) is a "simple recurrent network" (SRN) or a "simple recurrent neural network" (SRNN) having at most 900 trainable parameters, or at most 750, or at most 600, or at most 450, or at most 300, or at most 250, or at most 200, or at most 150, or at most 100 trainable parameters.

The magnetic sensor signals may be normalized to a predefined range (e.g. from −1.0 to +1.0) before they are input into the neural network, e.g. by dividing the measured value by a predefined constant which is stored in a non-volatile memory (e.g. flash) of the sensor device. The predefined constant may by a single value applicable to all the sensors or may be a specific value for each sensor location.

In an embodiment, the magnetic sensor signals are normalized by calculating a maximum magnitude of the magnetic sensor signals, and by dividing each of the magnetic sensor signals by an absolute value of this magnitude.

In an embodiment the recurrent network comprises at least one GRU unit, or at least one simple RNN unit or at least one LSTM unit.

In an embodiment, the artificial neural network (ANN) comprises or consists of at most 12 GRU units, e.g. only 1 GRU unit, or at most 2 GRU units, or at most 3 GRU units, or at most 4 GRU units, or at most 5 GRU units, or at most 6 GRU units, preferably organized in at most three, or at most two or at most one hidden layer.

In an embodiment, the artificial neural network (ANN) comprises or consists of at most 12 simple RNN units, e.g. only 1 simple RNN unit, or at most 2 simple RNN units, or at most 3 simple RNN units, or at most 4 simple RNN units, or at most 5 simple RNN units, or at most 6 simple RNN units, preferably organized in at most three, or at most two or at most one hidden layer.

In an embodiment, the artificial neural network (ANN) comprises or consists of at most 12 LSTM units, e.g. only 1

LSTM unit, or at most 2 LSTM units, or at most 3 LSTM units, or at most 4 LSTM units, or at most 5 LSTM units, or at most 6 LSTM units, preferably organized in at most three, or at most two or at most one hidden layer.

In some embodiments of the present invention, the sensor device can move with only one or only two degrees of freedom relative to the magnetic source, or vice versa.

In some embodiments of the present invention, the sensor device can move with more than two degrees of freedom relative to the magnetic source, or vice versa, for example with three degrees of freedom.

In an embodiment, a mean square error (MSE) of the position determined by the artificial neural network is smaller than 2% or smaller than 1.5% or smaller than 1% of the predefined measurement range.

In an embodiment, the recurrent neural network has only one hidden layer.

In an embodiment, the recurrent neural network has only one hidden layer with at most 4 GRU-units or has only one hidden layer with at most 4 SRNN-units or has only one hidden layer with at most LSTM units.

In an embodiment, the sensor device is movable relative to the magnetic source, or vice versa, along a straight line, wherein the movement is a pure translation (1 degree of freedom). The position to may determined be specified by a single coordinate, e.g. x. The measurement range may for example span a distance of at least ±2.5 mm, or at least ±5.0 mm, or at least ±7.5 mm, or at least ±10 mm, or at least ±15 mm, or at least ±20 mm, or at least ±25 mm.

In an embodiment, the sensor device is movable relative to the magnetic source, or vice versa, along a curved line, wherein the movement is a pure translation (1 degree of freedom).

In an embodiment, the sensor device is movable relative to the magnetic source, or vice versa, along a curved line, wherein the movement is a combination of a translation and a rotation, but the rotation is linked to the translation (1 degree of freedom).

In an embodiment, the sensor device is movable relative to the magnetic source, or vice versa, in a plane, without a rotation (2 degrees of freedom). The position to be determined may be specified by two orthogonal coordinates, e.g. x and y. The measurement range may for example span a distance of at least ±2.5 mm, or at least ±5.0 mm, or at least ±7.5 mm, or at least ±10 mm, or at least ±15 mm, or at least ±20 mm, or at least ±25 mm in both directions (e.g. X and Y).

In an embodiment, the sensor device is movable relative to the magnetic source, or vice versa, on a surface, with a rotation, but the rotation is dependent on the position on the surface (2 degrees of freedom).

In an embodiment, the magnetic source is movable relative to the sensor device, or vice versa, to rotate about a predefined axis, without a translation (e.g. a magnet mounted on the axis of a rotary button), 1 degree of freedom. The position to be determined may be specified by a single angle.

In an embodiment, the magnetic source is movable relative to the sensor device, or vice versa, to rotate about a predefined axis, with a translation, but the translation is dependent on the angular position (e.g. a magnet mounted at a non-zero offset from an axis of a rotary button), 1 degree of freedom.

In an embodiment, the magnetic source is mounted to a joystick handle, which can be rotated over two angles independently (e.g. backwards/forwards; and left/right). The magnet may be perform a translation, but this translation is dependent on the two angular values (2 degrees of freedom). The position to be determined may be specified by two angles. Examples are shown in FIG. 25 and FIG. 26.

In an embodiment, the number of degrees of freedom is at most 3, and the total number of trainable parameters of the artificial neural network is at most 900, or at most 800, or at most 700, or at most 600, or at most 500, or at most 400, or at most 300, or at most 250, or at most 200, or at most 150, or at most 100.

In an embodiment, the number of degrees of freedom is at most 2, and the total number of trainable parameters of the artificial neural network is at most 600, or at most 500, or at most 400, or at most 300, or at most 250, or at most 200, or at most 150, or at most 100.

In an embodiment, the number of degrees of freedom is at most 1, and the total number of trainable parameters of the artificial neural network is at most 300, or at most 250, or at most 200, or at most 150, or at most 100.

In an embodiment, the magnetic source is a permanent magnet.

In an embodiment, the sensor device is configured for performing a mere translation with respect to the magnetic source.

In an embodiment, the sensor device is configured for performing a combined translation and rotation with respect to the magnetic source, but the rotation is dependent on the translation.

In an embodiment, the magnetic source is configured for performing a mere translation with respect to the sensor device.

In an embodiment, the magnetic source is configured for performing a combined translation and rotation with respect to the sensor device, but the rotation is dependent on the translation.

In an embodiment, the magnetic sensors are Hall sensors, e.g. horizontal Hall sensors and/or vertical Hall sensors.

In an embodiment, the recurrent neural network is a stateful recurrent network.

In an embodiment, the semiconductor substrate comprises at least three or only three magnetic sensors situated in at least three different locations.

In an embodiment, the semiconductor substrate comprises at least four or only four magnetic sensors (e.g. H1, H2, H3, H4) situated in at least four different locations.

In an embodiment, the semiconductor substrate comprises a two-dimensional array or a two-dimensional arrangement of magnetic sensors (e.g. a 3×3 array, thus 9 sensor elements).

The at least three magnetic sensors may be collinear or may not be collinear.

The at least four magnetic sensors may be collinear or may not be collinear.

Simulations have shown that the accuracy of a system having a bar magnet (having a length of about 5 mm), wherein the sensor device can move over a distance of about 5.0 mm, e.g. from −2.500 mm to +2.500 mm, and wherein the sensor device has a semiconductor substrate of 1 to 4 mm², comprising:

only 1 horizontal Hall sensor yields an MSE ("mean square error") of less than 0.005 mm, and a GRU1 ("gated recurrent unit") with only about 10 to 20 parameters, e.g. about 13 parameters;

only 2 horizontal Hall sensors yields an MSE of less than 0.005 mm (e.g. equal to about 0.002 mm) and requires a GRU1 with only about 20 to 25 parameters;

only 3 horizontal Hall sensors yields an MSE of less than 0.005 mm (e.g. equal to about 0.0016 mm) and requires a GRU1 with only about 20 to 25 parameters;

only 4 horizontal Hall sensors yields an MSE of less than 0.005 mm (e.g. equal to of about 0.0011 mm and requires a GRU1 with only about 20 to 25 parameters When only considering the basic function of "determining a position", it can be concluded that these examples produce similar results, but they may act differently under non-ideal circumstances, such as for example, in the presence of an external disturbance field.

It is an advantage of using only Horizontal Hall elements without IMC ("integrated magnetic flux concentrator"), inter alia because this is cheaper to produce (no steps are needed to provide IMC).

In an embodiment, the semiconductor substrate comprises at least two 2D-magnetic pixels, each 2D magnetic pixel capable of measuring a first magnetic field component Bx oriented in an X-direction parallel to the semiconductor substrate, and a second magnetic field component Bz oriented in a Z-direction perpendicular to the semiconductor substrate. The at least 2D magnetic pixels are located in two different locations, e.g. spaced apart in the X-direction (i.e. the direction of relative movement), or spaced apart in the Y-direction (i.e. in a direction transverse to the movement), or spaced apart in both the X and Y direction.

In an embodiment, the semiconductor substrate comprises, or comprises only horizontal Hall elements configured for measuring magnetic field components perpendicular to the substrate (i.e. horizontal Hall elements without IMC). The signals obtained from these horizontal elements may be directly input to the neural network. Preferably the sensitivities of the horizontal elements are matched to each other in known manners, e.g. as described in US2019079142 (A1), or as described in EP3885779(A1), both incorporated herein by reference, or in any other suitable way. Alternatively or additionally, if the sensor device has at least three horizontal Hall elements, pairwise differences $\Delta$Bz may be input into the neural network. Alternatively or additionally, if the sensor device has three horizontal Hall elements H1, H2, H3 providing signals Bz1, Bz2 and Bz3 respectively, an average Bz_avg of these signals may be determined, and three pairwise differences (Bz1−Bz_avg), (Bz2−Bz_avg), (Bz3−B z_avg) may be input into the neural network.

In an embodiment, the semiconductor substrate comprises at least one 2D magnetic pixel, each comprising an integrated magnetic concentrator (IMC) and two horizontal Hall elements arranged near a periphery of the IMC and being 180° angularly spaced with respect to each other. Such a sensor device with 1 IMC is capable of measuring Bx1, Bz1 a a first sensor location. If the device also has a second 2D magnetic pixel, spaced apart from the first magnetic pixel, it is also capable of measuring Bx2, Bz2 at a second sensor location. In an embodiment, the signals (e.g. h1 to h4) obtained from these horizontal elements are input to the neural network. Alternatively or additionally, a sum and/or a difference of the signals obtained from horizontal Hall elements located on opposite sides of the IMC, is input to the neural network. Alternatively or additionally, if the sensor device has at least two IMC's, a pairwise difference $\Delta$Bx= (Bx1−Bx2) and/or a pairwise difference $\Delta$Bz=(Bz1−Bz2), may be input into the neural network. Optionally also a ratio $\Delta$Bx/$\Delta$Bz or $\Delta$Bz/$\Delta$Bx may be input into the neural network. Optionally also a sum of squares sqr($\Delta$Bx)+sqr($\Delta$Bz) may be input into the neural network.

In an embodiment, the semiconductor substrate comprises at least one 3D magnetic pixel, each comprising an integrated magnetic concentrator (IMC) and four horizontal Hall elements arranged near a periphery of the IMC and being 90° angularly spaced with respect to each other. Such a sensor device with 1 IMC is capable of measuring Bx1, By1, Bz1 a first sensor location. If the device also has a second 3D magnetic pixel, spaced from the first 3D pixel, it is also capable of measuring Bx2, By2, Bz2 at a second sensor location. In an embodiment, the signals obtained from the Hall elements are input into the neural network. Alternatively or additionally, a sum and/or a difference of the signals obtained from horizontal Hall elements located on opposite sides of the IMC, is/are input to the neural network. Alternatively or additionally, if the sensor device has at least two IMC's, a pairwise difference $\Delta$Bx=(Bx1−Bx2) and/or a pairwise difference $\Delta$By=(By1−By2), and/or a pairwise difference $\Delta$Bz=(Bz1−Bz2), may be input into the neural network. Optionally one or more ratio's of these pairwise differences (e.g. $\Delta$Bx/$\Delta$Bz, $\Delta$By/$\Delta$Bz, $\Delta$Bx/$\Delta$By) may also be input into the neural network. Optionally also a sum of squares sqr($\Delta$Bx)+sqr($\Delta$By)+sqr($\Delta$Bz) may be input into the neural network.

In an embodiment, the semiconductor substrate comprises, or comprises only vertical Hall elements configured for measuring magnetic field components parallel to the substrate. The vertical Hall elements may all be oriented in a single direction, but that is not absolutely required, and e.g. some may be oriented in the X-direction, and others may be oriented in the Y-direction.

In an embodiment, the semiconductor substrate comprises, or comprises only MR elements (magneto-resistive elements), e.g. GMR elements, AMR elements, XMR elements.

In an embodiment, the magnetic source is a two-pole magnet, e.g. an axially or diametrically magnetized two-pole ring or disk magnet, or a two-pole bar magnet.

In an embodiment, the magnetic source is a four-pole magnet, e.g. an axially magnetized four-pole ring or disk magnet.

In an embodiment, the sensor device furthermore comprises a temperature sensor, and step a) further comprises: measuring a temperature (e.g. Temp) of the semiconductor substrate using said temperature sensor, and providing the measured temperature as an input to the neural network; and step b) comprises: determining the position (e.g. x; x,y; $\varphi$,$\psi$) of the sensor device relative to the magnetic source based on said plurality of magnetic sensor signals and based on the measured temperature signal.

If embodiments where the temperature is added as an input to the neural network, the training data preferably contains data for at least two or at least three, or at least four, or at least five or at least six different temperatures.

In an embodiment, the training data includes at least one trajectory at a first temperature smaller than 0° C. and includes at least one trajectory at a second temperature of at least 80° C., and contains at least a third trajectory at a third temperature between 0° C. and 80° C.

In an embodiment, the sensor device furthermore comprises a temperature sensor, and the method further comprises the step of measuring a temperature of the semiconductor substrate using said temperature sensor, and providing the measured temperature as an input to the neural network; and wherein step b) comprises: determining the position of the sensor device relative to the magnetic source based on said plurality of magnetic sensor signals and based on the measured temperature; and wherein the network is trained for estimating the position using training data derived from computer simulations and/or obtained from or derived from actual measurements, for different temperatures.

In this embodiment, a single recurrent neural network is used for (1) temperature correction of the magnetic sensor signals, and at the same time also for (2) determining a position of the sensor device relative to the magnetic source.

In an embodiment, the network is trained for estimating the position (e.g. 1D position or 2D or 3D position) using training data obtained from or derived from simulation data provided by computer simulations and/or obtained from or derived from measurement data provided by actual measurements.

The 1D neural network may be trained in stateless mode, and inference is done in stateful mode. This allows to reduce the on-board memory requirements and to limit the computational complexity. Using this technique, a new prediction is made for each new input sample.

The 2D neural network may be trained in stateful mode, and inference is done in stateful mode.

In an embodiment of the 2D neural network, the measurement range is sampled using loopable Bezier curves, e.g. at least 128, or at least 256, or at least 512 Bezier curves.

In an embodiment, the start point and end point of at least some of these Bezier curves is deliberately chosen outside of the actual measurement range. For example, if the X-range and the Y-range extend from −2.5 mm to +2.5 mm, the neural network may deliberately be trained for positions of X and Y varying from −3.0 mm to +3.0 mm. In general, the start- and end points of the trajectories may be chosen at least 10% outside of the actual measurement range.

In an embodiment, the simulation data and/or the measurement data is interpolated to increase the spatial resolution at least by a factor of 2.

In an embodiment where the simulation data includes a temperature, the measurement data is interpolated to increase the resolution of the temperature at least by a factor of 2.

In an embodiment, wherein at least some or all of the actual measurements are performed by physically moving a sensor device relative to a magnetic source, or vice versa.

In an embodiment, at least some or all of the actual measurements are performed by generating a magnetic field using a test device comprising at least one coil (e.g. at least two coils, e.g. at least three coils), and by causing at least one current to flow through said at least one coil.

In an embodiment, artificial noise is added to the training data.

In an embodiment, the network is trained for estimating the position (e.g. 1D position or 2D or 3D position) using training data derived from computer simulations with addition of artificial noise, and/or obtained from or derived from actual measurements, or a combination of both.

Applicant is of the opinion that the addition of artificial noise may be known in areas such as voice recognition or face recognition but is counter-intuitive for the field of magnetic position sensors, where a position is to be determined accurately. In each case, it is not predictable that addition of artificial noise to a neural network having a relatively simple architecture and/or using a relatively small number of trainable parameters, will improve the accuracy of a position sensor system.

It is noted that "data obtained from actual measurements" contains "actual noise", hence no artificial noise needs to be added, although it may.

In an embodiment, a magnetic disturbance field is added to the training data.

In an embodiment, the network is trained for estimating the position using training data derived from computer simulations and/or obtained from or derived from actual measurements, with the addition of a magnetic disturbance field (Bext).

Preferably, however, the values to which a constant value is added to all the sensors for all the sensors magnetic disturbance field is a homogeneous but time-varying disturbance field, meaning that the disturbance vector, or the disturbance value (if all sensors are oriented in the same direction), is the same for all sensor locations. The disturbance field can be added to the simulation results, or can be added to the actual measurement results, or the actual measurements may contain can be performed in an environment having a disturbance field.

In other words, in this embodiment, the training data includes simulated data for a superposition of the magnetic field generated by the magnetic source and a homogeneous external disturbance field. For example, if all the sensor elements measure a Bz-value, then a given value Bz_ext may be added to the sensor signals of all the sensors that are measured substantially simultaneously. The values of Bz_ext may vary over time, e.g. may vary relatively slowly as a function of time, e.g. as a modulated signal, e.g. an amplitude modulated signal, or a frequency modulated signal.

In a particular embodiment, the training data uses at least 10 different values of the external field, or at least 20 different values, or at least 32 different values.

In an embodiment, a mounting offset (e.g. Yoffset) is added to the training data.

In an embodiment, the network is trained for estimating the position using training data derived from computer simulations and/or obtained from or derived from actual measurements, taking into account a mounting offset, e.g. an offset in the height position (air gap), and/or a lateral offset in case of a 1D sensor system.

In case of the a 1D-movement along a straight line, the mounting offset may comprise for example one or both of a lateral offset (Yoffset) and a height offset (Zoffset).

In case of the a 2D-movement in a plane, the mounting offset may comprise a height offset (Zoffset).

In an embodiment, the training data comprises measurement data provided by actual measurements performed on at least 3 different sensor devices, e.g. from 3 to 50, or from 3 to 25 different sensor devices.

Preferably each of these at least 3 different sensor devices comprise a semiconductor substrate obtained from at least three different semiconductor wafers, for example from three "corner wafers", i.e. wafers produced at process corners, e.g. from at least 3 different corner wafers known as TT (typical-typical), SS (slow-slow), and FF (fast-fast).

In embodiment, wherein the training data comprises a plurality of trajectories for approaching positions in an envisioned measurement range from a plurality of different directions.

In an embodiment, the sensor device is movable relative to the magnetic source or vice versa with only 1 degree of freedom, and wherein the training data comprises at least two trajectories for approaching various measurement positions of a measurement range in two different directions (e.g. one trajectory with increasing X-values, and one trajectory with decreasing X-values).

In an embodiment, the sensor device is movable relative to the magnetic source or vice versa with only 2 degrees of freedom, and wherein the training data comprises at least four trajectories for approaching various measurement positions of a measurement range in at least four different directions (e.g. a first trajectory with increasing X-values and increasing Y-values, a second trajectory with increasing X-values and decreasing Y-values; a third trajectory with decreasing X-values and increasing Y-values, and a fourth trajectory with decreasing X-values and decreasing Y-values).

In an embodiment, the sensor device is movable relative to the magnetic source or vice versa with only 3 degrees of freedom, and wherein the training data comprises at least eight trajectories for approaching various measurement positions of a measurement range in at least eight different directions (e.g. a first trajectory with increasing X and Y and Z values, a second trajectory with increasing X and Y but decreasing Z-values, a third trajectory with increasing X and Z values but decreasing Y values, a fourth trajectory with increasing X values but decreasing Y and Z values, a fifth trajectory with decreasing X values but increasing Y and Z values, a sixth trajectory with decreasing X and Y values but increasing Z values, a seventh trajectory with decreasing X and Z values but increasing Y values, and an eighth trajectory with decreasing X, Y and Z values).

In an embodiment, some or all of the trajectories are defined by Bezier curves.

In an embodiment, some or all of the trajectories are defined by Bezier curves that extend at least 10% or at least 20% beyond the envisioned measurable range.

In an embodiment, the sensor device is movable relative to the magnetic source along a straight line or along a curved line. In this case the method is a "method of determining a 1D position".

In an embodiment, the neural network has only one output node (for providing the estimated position value), and the hidden layers comprise only a single GRU-unit. In this case only about 20 to 25, e.g. about 23 parameters need to be trained.

In an embodiment, the sensor device is movable relative to the magnetic source in a two-dimensional plane. In this embodiment, step b) may comprise determining a first coordinate (x) along a first axis (X), and a second coordinate (y) along a second axis (Y), preferably perpendicular to the X-axis. In this case the method is a "method of determining a 2D position". The neural network may have only two output nodes, and the hidden layers may comprise only two or only four GRU-units.

In an embodiment, the sensor device is movable relative to the magnetic source in three directions. In this embodiment, step b) may comprise determining a first coordinate (x) along a first axis (X), and a second coordinate (y) along a second axis (Y), preferably perpendicular to the X-axis, and a third coordinate (z) along a third axis (Z) preferably perpendicular to the X and Y axis. In this case the method is a "method of determining a 3D position". The neural network may have only three output nodes, and the hidden layers may comprise only three or only six GRU-units.

In an embodiment, step b) further comprises determining one or more additional signals, in one or more of the following ways: by determining one or more pairwise differences, by determining one or more magnetic field gradients, by determining at least one average signal and by subtracting this average signal from at least two measured signals, by normalizing the signals (e.g. by scaling all the signals), by calculating a ratio of two measured signals, by calculating a ratio of two pairwise differences, by calculating a ratio of two gradients, and feeding at least one of these additional signals into the neural network; and wherein the neural network is trained for estimating the position using training data derived from computer simulations and/or actual measurements, and trained with one or more of these additional signals.

In an embodiment, the sensor device comprises at least one group of sensors configured for measuring parallel magnetic field components (e.g. Bz1 and Bz2), and the sensor device is configured for determining one or more pairwise differences for said one or more groups, and the pairwise difference(s) is/are input into the neural network, and the neural network is trained for estimating the position based on training data that includes said one or more pairwise difference(s).

It is an advantage of this embodiment that, if pairwise differences, gradients, or average-compensated data is input into the neural network, the neural network does not need to be trained to reduce or eliminate a magnetic disturbance field.

Likewise, if a ratio of pairwise differences, or a ratio of gradients, or a ratio of average-compensated data is input into the neural network, the neural network does not need to be trained for temperature variations.

In an embodiment, the sensor device is configured for measuring at least two magnetic field components parallel to the semiconductor substrate (e.g. Bx1 and Bx2), and for measuring at least two magnetic field components perpendicular to the semiconductor substrate (e.g. Bz3 and Bz4 at the same locations or at different locations), and the sensor device would be provided for determining two pairwise differences $\Delta Bx=(Bx2-Bx1)$ and $\Delta Bz=(Bz2-Bz1)$, and/or a ratio of these pairwise differences, e.g. $R1=(\Delta Bx/\Delta Bz)$ or $R2=(\Delta Bz/\Delta Bx)$, and the neural network would be configured to receive 6 input signals, namely Bx1, Bx2, Bz1, Bx2, $\Delta Bx$ and $\Delta Bz$, or to receive 7 input signals: namely Bx1, Bx2, Bz1, Bx2, $\Delta Bx$, $\Delta Bz$ and R1, or to receive 7 input signals: namely Bx1, Bx2, Bz1, Bx2, $\Delta Bx$, $\Delta Bz$ and R2.

In an embodiment, the recurrent neural network comprises at most twelve, or at most six, or at most four Gated Recurrent Units (GRU).

In an embodiment, the recurrent neural network comprises one to four Gated Recurrent Units GRU-units. The GRU may use a tan h function and/or a sigmoid function.

A "GRU-node" is known in the art, and stands for "Gated Recurrent Unit", which is typically used for linguistic applications such as speech recognition, text classification, textual analysis, etc., and inter alia for this reason, but it is not a trivial choice for use in a position sensor system.

It came as a complete surprise that, using four Hall sensor signals as input, and using a GRU-network, only 23 parameters need to be trained, and yet, the accuracy is very comparable with that of "Kalmann-filtering" (which is often considered the "state of the art"), but can be calculated approximately 5 times faster, mainly thanks to the low number of trainable parameters.

The GRU or GRU's may be implemented in hardware, e.g. as described in US20180046901(A1), incorporated herein by reference in its entirety.

Preferably the GRU uses a time-series of at least 3 frames, or at least 5 frames, or at least 10 frames, or at least 20 frames. As can be seen in FIG. 10A, the accuracy of the position-estimate can be improved by choosing a larger time-series.

In an embodiment, the neural network comprises at most twelve, or at most six, or at most four simple RNN units (SRNN).

In an embodiment, the neural network comprises at most twelve, or at most six, or at most four LSTM units.

According to a second aspect, the present invention also provides a position sensor system comprising: a magnetic source (e.g. a permanent magnet); a sensor device comprising a semiconductor substrate comprising a plurality of at least two magnetic sensors situated in at least two different locations, or at least for magnetic sensors situated in at least two different locations (e.g. each measuring Bx and Bz); a processing circuit configured for performing a method according to the first aspect.

The processing circuit may be implemented on the same substrate as the one comprising the sensor elements, but the present invention is not limited thereto. In an embodiment, the sensor device may comprise a sensor chip comprising the semiconductor substrate comprising the magnetic sensors and the optional temperature sensor, and the processing circuit is implemented in a processing chip. The sensor chip and the processing chip are communicatively connected to each other. They may be implemented on a single printed circuit board (PCB), but that is not absolutely required.

In an embodiment, the sensor device is movable relative to the magnetic source with only 1 degree of freedom, and the sensor device comprises 4 to 25, or 4 to 16, or 4 to 9 magnetic sensors, and the sensor device or the magnetic source is movable along a straight line or along a curved line, and the number of trainable parameters is at most 150, or at most 100, or at most 50.

In an embodiment, the sensor device is movable relative to the magnetic source with only 2 degrees of freedom, and the sensor device comprises 4 to 25, or 4 to 16, or 4 to 9 magnetic sensors, and the sensor device or the magnetic source is movable in two directions in a virtual plane (e.g. XY) or over a virtual surface, and the number of trainable parameters is at most 300, or at most 250, or at most 200, or at most 150, or at most 100.

In an embodiment, the movement of the sensor device relative to the magnetic source is a pure translation without a rotation.

In an embodiment, the movement of the sensor device relative to the magnetic source is a pure rotation without a translation.

In an embodiment, the movement of the sensor device relative to the magnetic source is a combination of a translation and a rotation, but the rotation is dependent on the translation.

In an embodiment, a mean square error (MSE) of the position determined by the artificial neural network is smaller than 2%, or smaller than 1.5%, or smaller than 1% of the predefined measurement range.

In an embodiment, the semiconductor substrate comprising the plurality of magnetic sensors has a size of at most 3.0 mm×3.0 mm.

In an embodiment, the processing circuit comprises a programmable processor having a 32 bit CPU core and a floating point unit (FPU), configured to run at an internal clock frequency of at most 400 or at most 200 or at most 100 MHz, and comprises at most 2 Mbytes or at most 1 Mbyte of flash and at most 512 Kbytes or at most 256 Kbytes of RAM; and the artificial neural network is implemented in software configured to be executed by said programmable processor.

The processor may have an ARM® 32-bit Cortex®-M4 CPU core with FPU.

In an embodiment, the semiconductor substrate contains 4 to 25 horizontal Hall elements, or 4 to 16 horizontal Hall elements, or 4 to 9 Horizontal Hall elements, preferably without IMC, and all of the magnetic sensor elements are Horizontal Hall elements, thus there are no vertical Hall elements or magneto-resistive elements.

In an embodiment, the position sensor system further comprises an AI accelerator for executing the artificial neural network.

The AI accelerator may be implemented in the analog domain or the digital domain.

According to a third aspect, the present invention also provides a position sensor device comprising: a semiconductor substrate comprising at least two magnetic sensors spaced apart from each other and configured for providing at least two magnetic sensor signals; a processing circuit configured for performing a method according to the first aspect.

In an embodiment, the semiconductor substrate is implemented in a first chip, and the processing circuit is implemented in a second chip, and the first and second chip are mounted on a printed circuit board (PCB).

In an embodiment, the processing circuit may be incorporated inside the position sensor device. The position sensor device may be in the form of a PCB or module or assembly with multiple chips, or in the form of a single package.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 3A is a grayscale picture.

FIG. 8A to FIG. 8F show examples of sensor arrangements as may be used in embodiments of the present invention.

as illustrated in FIG. 11A), depending on the number of input signals.

as shown in FIG. 16. The network has only two GRU units.

as shown in FIG. 16. The network has two fully connected hidden layers, each comprising two GRU units, thus only four GRU units in total.

FIG. 21 is a table showing the number of trainable parameters for a sensor system having four magnetic sensors arranged on a straight line (e.g. as illustrated in FIG. 8A), and having one to four GRU-units per layer, with only one or only two layers, and an estimate of the resulting accuracy (in terms of MSE in mm).

FIG. 22 is a table showing the number of trainable parameters for a sensor system having four magnetic sensors arranged on a regular 2×2 grid (e.g. as illustrated in FIG. 8B), and having one to four GRU-units per layer, with only one or only two layers, and an estimate of the resulting accuracy (in terms of MSE in mm).

as shown in FIG. 1 or FIG. 16. The network has three hidden layers, each comprising four GRU units, thus twelve GRU units in total.

FIG. 24 shows a flow-chart of a method for determining a position of a sensor device relative to a magnetic source, or vice versa, proposed by the present invention, wherein the movement has only 1 or 2 or 3 degrees of freedom, e.g. a pure translation without a rotation (e.g. as illustrated in FIG. 1 and FIG. 16), or a pure rotation about a stationary axis (e.g. a magnet of a rotary knob or button which is mounted on-axis), or a movement with a rotation and a translation but wherein the rotation is dependent on the translation and vice versa (e.g. a joystick that can be moved back/forth and left/right as illustrated in FIG. 25 or FIG. 26, or a magnet of a rotary knob or button which is mounted off-axis), etc.

FIG. 29 shows a table with a typical number of trainable parameters for a 1D positioning system with a recurrent neural network having 5 input signals (4 magnetic signals and temperature) for various architectures, and FIG. 30 shows an illustrative accuracy of these systems.

FIG. 31 shows a table with a typical number of trainable parameters for a 2D positioning system with a recurrent neural network having 5 input signals (4 magnetic signals and temperature) for various architectures, and FIG. 32 shows an illustrative accuracy of these systems.

Figure 1:
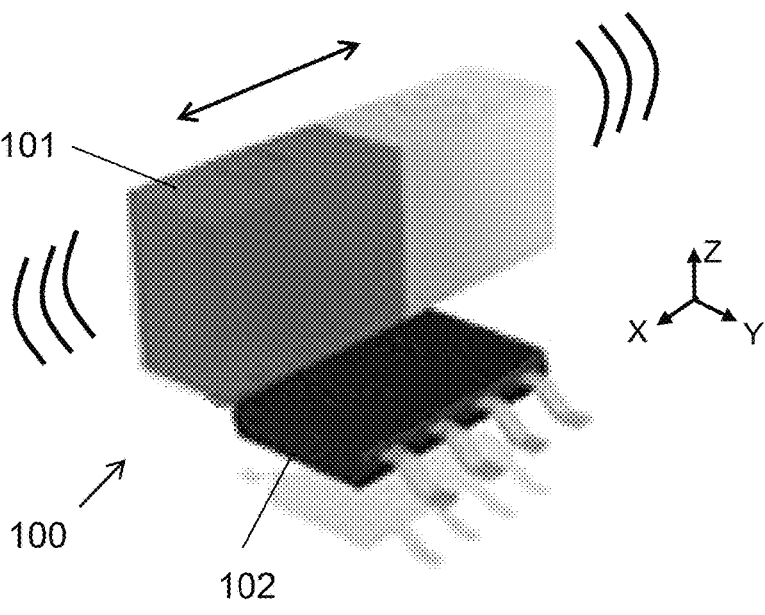
FIG. 1 is a perspective view of a position sensor arrangement comprising a magnet and a sensor device, wherein the magnet is movable along a straight line relative to the sensor device.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the abbreviation "DOF" means "Degrees of Freedom".

In this document, the abbreviation "ANN" means "Artificial Neural Network".

In this document, the abbreviation "RNN" means "Recurrent Neural Network".

In this document, the abbreviation "LSTM" means "Long Short-Term Memory Network".

In this document, the abbreviation "GRU" means "Gated Recurrent Unit".

In this document, the abbreviation "MSE" means "Mean Square Error", and is expressed in [mm], unless mentioned otherwise.

In this document, unless explicitly mentioned otherwise, the term "magnetic sensor device" or "sensor device" refers to a device comprising at least two magnetic sensor elements, preferably integrated in a semiconductor substrate. The sensor device may be comprised in a package, also called "chip", although that is not absolutely required.

In this document, the term "sensor element" or "magnetic sensor element" refers to a single vertical Hall element or a single horizontal Hall element or a single magneto-resistive (MR) element (e.g. a GMR element or an XMR element or an AMR element).

In this document, the term "magnetic sensor" or "magnetic sensor structure" can refer to a group of components or a sub-circuit or a structure capable of measuring a magnetic quantity, such as for example a group of at least two magnetic sensor elements, or a Wheatstone-bridge containing four MR elements.

In certain embodiments of the present invention, the term "magnetic sensor" or "magnetic sensor structure" may refer to an arrangement comprising one or more integrated magnetic concentrators (IMC), also known as "integrated flux concentrators", and two or four or eight horizontal Hall elements arranged near the periphery of the IMC.

In this document, the expression "in-plane component of a magnetic field vector" and "orthogonal projection of the magnetic field vector in the sensor plane" mean the same. If the sensor device is or comprises a semiconductor substrate, this also means "magnetic field components parallel to the semiconductor substrate". In-plane components are typically referred to as Bx or By.

In this document, the expression "out-of-plane component of a vector" and "Z component of the vector" and "orthogonal projection of the vector on an axis perpendicular to the sensor plane" mean the same. Out-of-plane components are typically referred to as Bz.

Embodiments of the present invention are typically described using an orthogonal coordinate system which is fixed to the sensor device, and having three axes X, Y, Z, where the X and Y axis are parallel to the substrate, and the Z-axis is perpendicular to the substrate.

In this document, the expression "spatial derivative" or "derivative" or "spatial gradient" or "gradient" are used as synonyms. In the context of the present invention, a gradient is typically determined as a difference between two values measured at two different locations which may be spaced apart by a distance in the range from 1.0 mm to 3.0 mm. In theory the gradient is calculated as the difference between two values divided by the distance "dx" between the sensor locations, but in practice the division by "dx" is often omitted, because the measured signals need to be scaled anyway.

For this reason, the terms "magnetic field gradient" and "pairwise difference" can be used interchangeably, In this document, horizontal Hall plates are typically referred to by H1, H2, etc., signals from these horizontal Hall plates are typically referred to by h1, h2, etc.; vertical Hall plates are typically referred to by V1, V2, etc.; and signals from these vertical Hall plates are typically referred to by v1, v2, etc.

In this document, the expression "the neural network is trained" means that the neural network is trained using "machine learning" (ML) or using a deep learning technique. Software for deep learning are known in the art, and are commercially available, e.g. from Google Inc.

In this document, the expression "stateful neural network" means that prediction of the output signal(s) is done on a per-frame-basis.

In the present invention, a network topology having a single hidden layer with "n1" components, is noted as: "GRU n1", see for example FIG. 11A, FIG. 14, FIG. 18.

In the present invention, a network topology having two hidden layers, the first hidden layer having "n1" GRU-components, and the second hidden layer having "n2" GRU components, is noted as: "GRU n1, n2", see for example FIG. 13A, FIG. 15, FIG. 20.

In this document, the expression "GRU unit" or "GRU component" mean the same, unless clear from the context that something else is meant.

In the present invention, a network topology having three hidden layers, the first hidden layer having "n1" GRU-components, the second hidden layer having "n2" GRU components, the third hidden layer having "n3" GRU components, is noted as: "GRU n1, n2, n3", see for example FIG. 21 and FIG. 22.

Likewise, "RNN n1" means a network topology having a single hidden layer with n1 RNN components; "RNN n1 n2" means a network topology having two hidden layers, namely a first hidden hidden with n1 RNN components and a second hidden layer with n2 RNN components; "RNN n1 n2 n3" means a network topology having three hidden layers, namely a first hidden hidden with n1 RNN components, a second hidden layer with n2 RNN components, and a third hidden layer with n3 RNN components.

Likewise, "LSTM n1" means a network topology having a single hidden layer with n1 LSTM components; "LSTM n1 n2" means a network topology having two hidden layers, namely a first hidden hidden with n1 LSTM components and a second hidden layer with n2 LSTM components; "LSTM n1 n2 n3" means a network topology having three hidden layers, namely a first hidden hidden with n1 LSTM components, a second hidden layer with n2 LSTM components, and a third hidden layer with n3 LSTM components.

The present invention relates in general to the field of magnetic position sensor systems, devices and methods. More in particular, the inventors had the task to find a method and a system for precise position determination of an object that can move with only 1 or only 2 or only 3 degrees of freedom (DOF), for use in anti-counterfeiting applications, automotive applications, industrial applications, and/or robotic applications.

The inventors came to the idea of using an artificial neural network, but in order to be commercially viable, the solution has to be "relatively lightweight", e.g. in terms of number of layers, in terms of number of nodes, and/or in terms of trainable parameters. Thus, they had to solve the problem of finding whether a Neural Network could be built that is relatively lightweight, and at the same time, provides a high accuracy, and can be processed almost in real-time (e.g. within 10 ms), in other words, they had to find out whether such a lightweight neural network exists, and/or how many trainable parameters would be needed to achieve a sufficient accuracy for the envisioned applications, etc.

Artificially Neural Networks (ANN) exist already since several decades. According to some sources at least six types of Artificial Neural Networks are being used in Machine Learning: (1) Feedforward Neural Network, (2) Radial basis function Neural Network, (3) Kohonen Self Organizing Neural Network, (4) Recurrent Neural Network (RNN), (5) Convolutional Neural Network, and (6) Modular Neural Network.

Artificially Neural Networks (ANN's) are typically used for solving highly complex mathematical problems, such as e.g. facial recognition, voice recognition, handwriting-recognition. These networks typically requires tens of thousands of nodes, and need to be trained with many thousands of training images or sound clips. The execution of such a network requires a considerable amount of time.

At least for the reasons above, the use of an Artificial Neural Network is not an obvious choice for building a position sensor system having only 1 or only 2 or only 3 degrees of freedom, not because it was believed that such a system would not work, but because it was believed that such a network would be highly complex, and/or would require considerable processing power and/or memory resources and/or processing time, and for these and other reasons would not be suitable for use in automotive applications, industrial applications, and/or robotic applications where a nearly real-time response, e.g. a response within about 10 ms, is an absolute requirement.

Referring to the Figures.

FIG. 1 is a perspective view of a position sensor arrangement 100 comprising a magnetic source 101 and a sensor device 102. The magnetic source of FIG. 1 is a two-pole magnet, but magnets having more than two poles may also be used, for example having four poles. The shape of the magnet shown is a bar magnet, but that is not required for the present invention to work, and other magnet shapes can also be used, for example a ring magnet or a disk magnet. The sensor device is preferably a packaged integrated chip. In the example of FIG. 1, the sensor device 102 has a fixed position, and the magnet 101 is movable along a straight-line X. In other embodiments, the magnet 101 may have a fixed position, and the sensor device is movable relative to the magnet 101. The present invention is limited to position sensor systems allowing a movement having only 1 degree of freedom (e.g. illustrated in FIG. 1), or having only 2 degrees of freedom (e.g. illustrated in FIG. 16, FIG. 25, FIG. 26), e.g. a pure translation along a straight line, or a pure translation along a curved line, or a pure translation in a plane XY, or having only 3 degrees of freedom (not shown), e.g. a pure translation in 3 dimensions. In preferred embodiments of the sensor arrangement of FIG. 1, the position in the Y-direction (transverse offset) is preferably constant and equal to zero, and the position in the Z-direction (in the height direction) is also preferably constant and typically has a value in the range from 0.1 mm to 10.0 mm, or in the range from 0.1 mm to 5.0 mm, but due to mounting tolerances the actual value of Y and Z may be slightly different.

Figure 2:
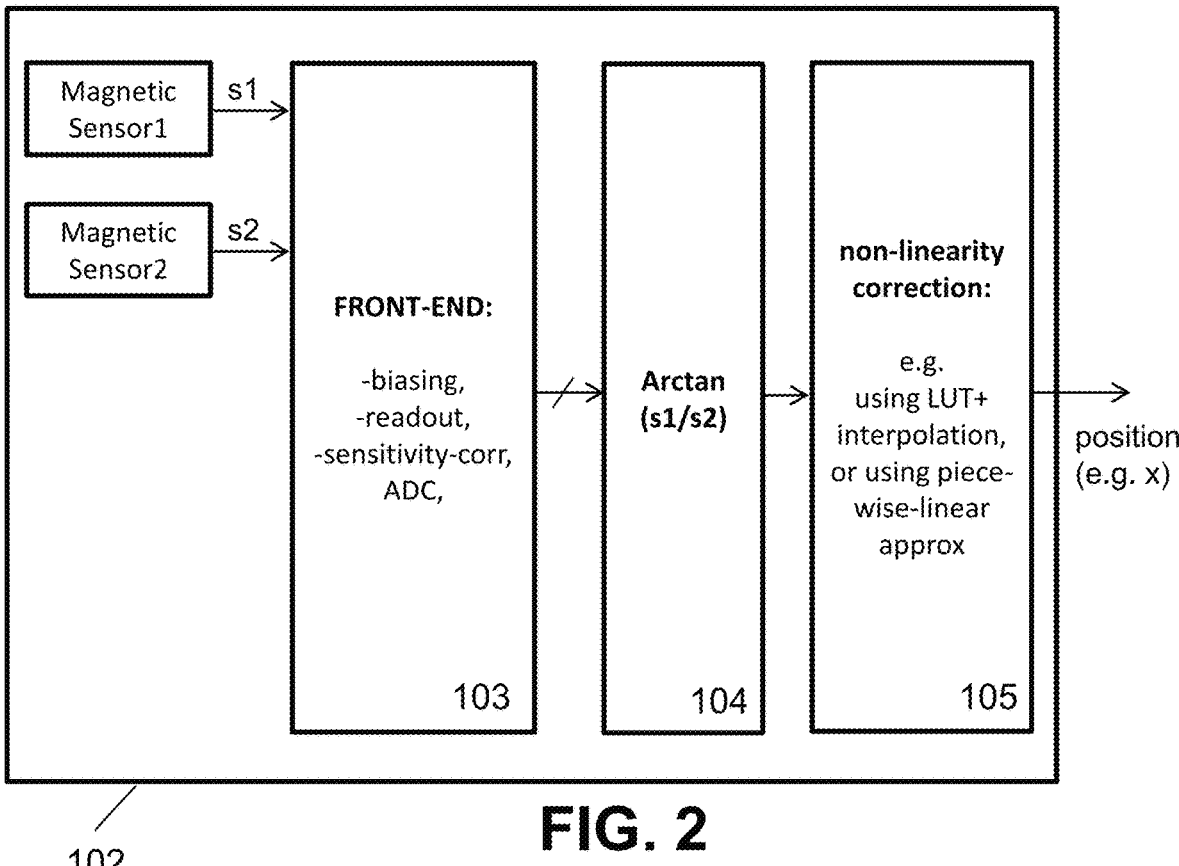
FIG. 2 is a high-level block-diagram of a position sensor device which may be used in the position sensor system of FIG. 1.

FIG. 2 shows a high-level block-diagram of a classical position sensor device 102, which can be used in the position sensor system of FIG. 1 to determine the position of the magnet 101 relative to the sensor device 102. The sensor device comprises a first magnetic sensor providing a first signal s1, e.g. a sine-like signal, and a second magnetic sensor providing a second signal s2, e.g. a cosine-like signal. The first and second magnetic sensor may be two horizontal Hall elements spaced apart in the X-direction, or two vertical Hall elements spaced apart in the X-direction. The sensor device 102 may comprise a "front-end" 103 configured for biasing and reading-out the sensor elements, and for digitizing the measured signals s1, s2 using an analog-to-digital convertor (ADC). The digitized signals may be further processed using an arctangent function in block 104, and the result may be "linearity-corrected" in a "post-processing" block 105, for example using a look-up-table (LUT) with optional interpolation, or using a piece-wise-linear approximation, optionally with programmable data points. Such circuits are known in the art, and hence need not be explained in more detail here. It is noted that the partitioning of the various functions over the blocks 103, 104 and 105 is somewhat arbitrary, e.g. because the functions of the blocks 104 and 105 may be implemented in hardware or in software executed by a programmable processor, and the ADC may be considered a separate block situated between the front-end 103 and the programmable processor, etc. The main purpose of FIG. 2 is to show that a classical solution to determine the position X of the magnet 101 typically comprises a goniometric function and a post-processing step, contrary to solutions proposed by the present invention, which will be described further.

Figures 3A, 3B:
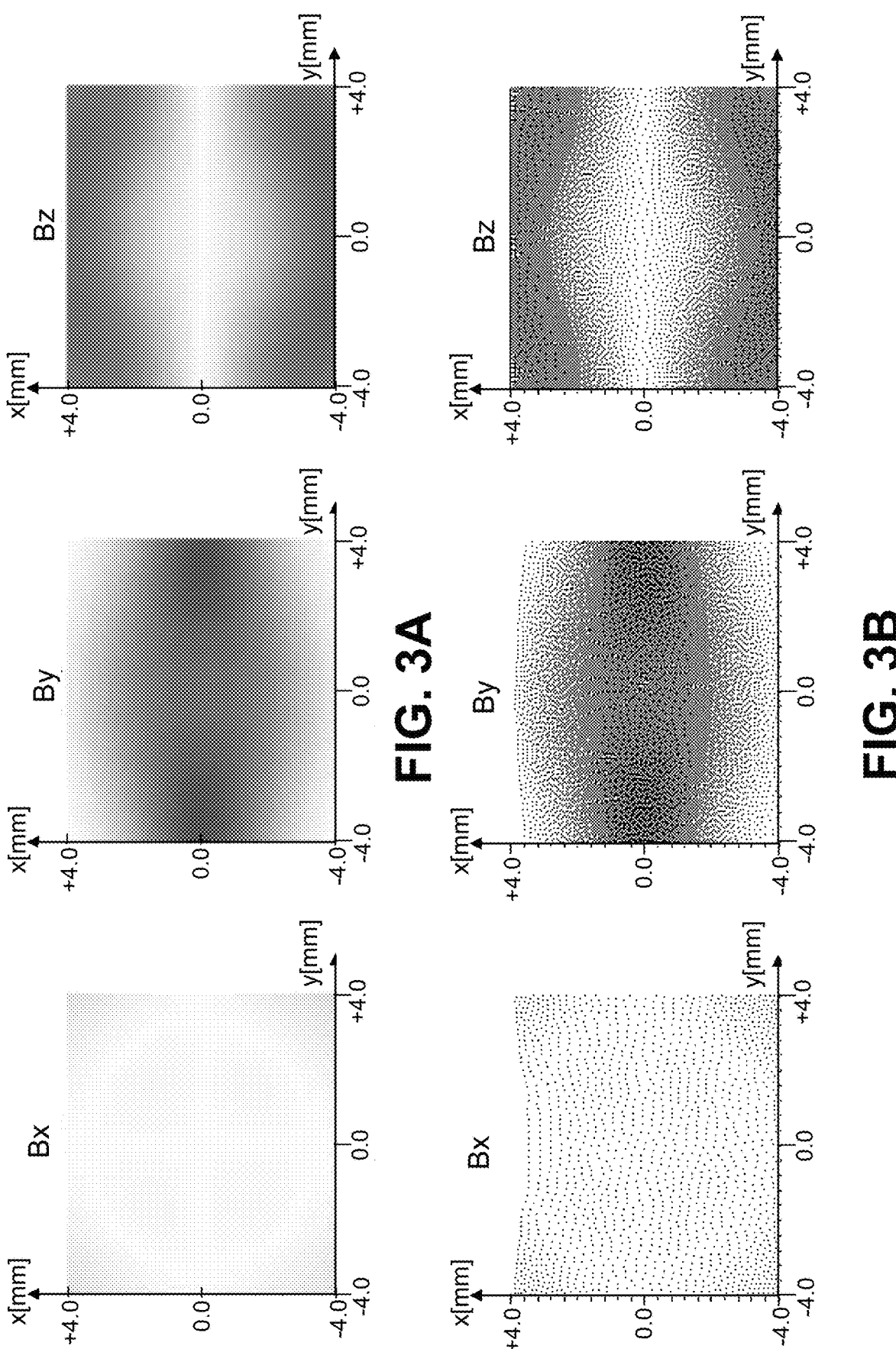
FIG. 3A shows the magnitude of magnetic field components Bx, By, Bz as would be measured in a plane XY at a distance of 5.0 mm below the two-pole bar magnet of FIG. 1, in arbitrary units.
FIG. 3B is a dithered picture (provided for illustrative purposes only).

FIG. 3A and FIG. 3B show the magnitude of magnetic field components Bx, By, Bz as would be measured at various locations (x, y) in a plane XY at a distance of about 5.0 mm from the two-pole bar magnet 101 of FIG. 1. The amplitude is expressed in arbitrary units. FIG. 3A is a grayscale picture. FIG. 3B is a dithered picture, provided for illustrative purposes. Such graphs can be obtained by actual measurements, or by computer simulations. In the example shown in FIG. 3A and FIG. 3B, the graphs provide amplitudes of Bx, By and Bz for X-values and Y-values ranging from −4.0 mm to +4.0 mm, while the measurement range for the system shown in FIG. 1 is limited from −2.5 mm to +2.5 mm. It shall be clear that this is only an example, and embodiments of the present invention may use other magnets and/or other measurement ranges.

Figure 4A:
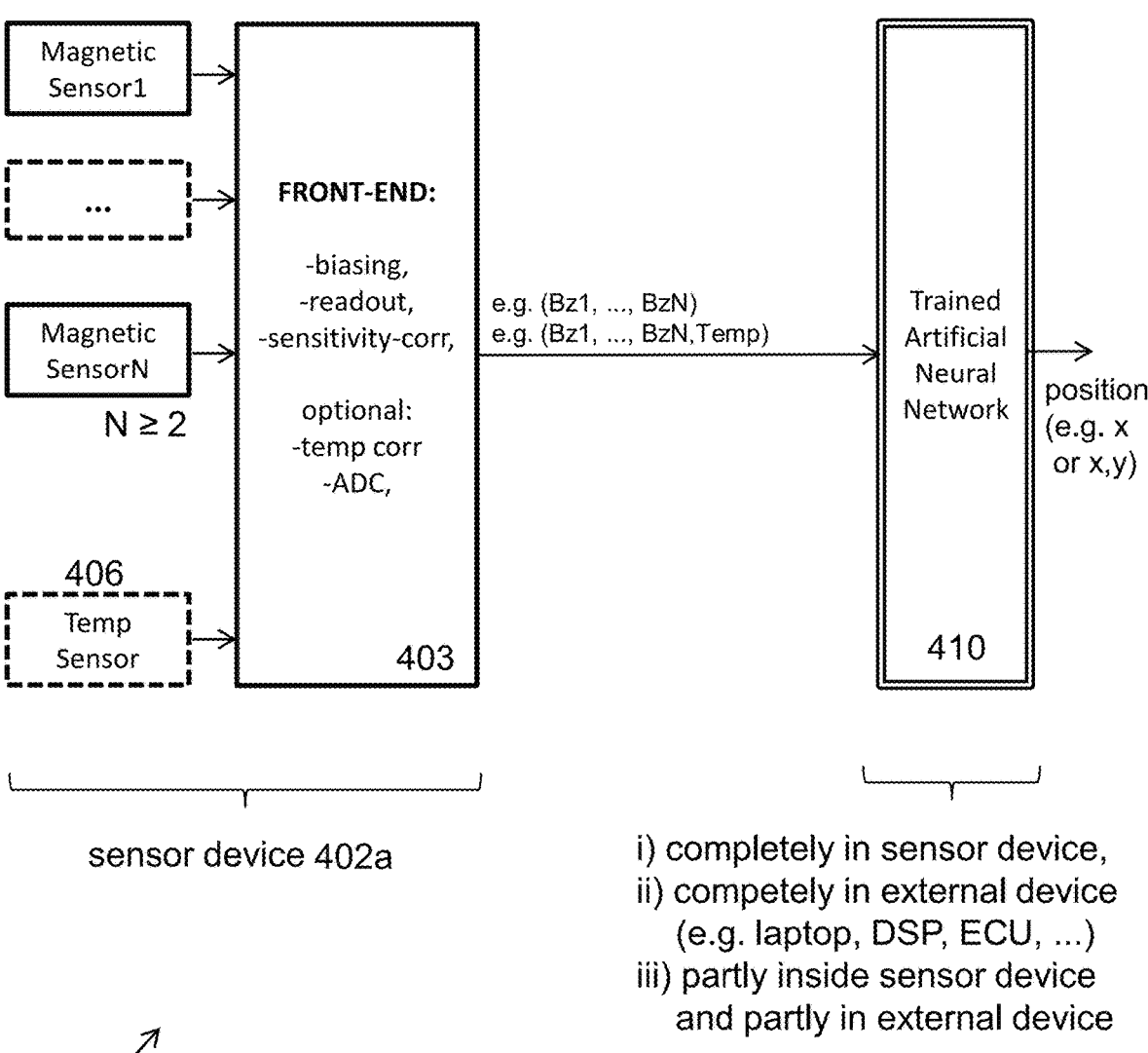
FIG. 4A is a high-level block-diagram of a position sensor system proposed by the present invention, configured for determining a position of a sensor device relative to a magnetic source, or vice versa, using a trained artificial neural network (ANN).
Figure 16:
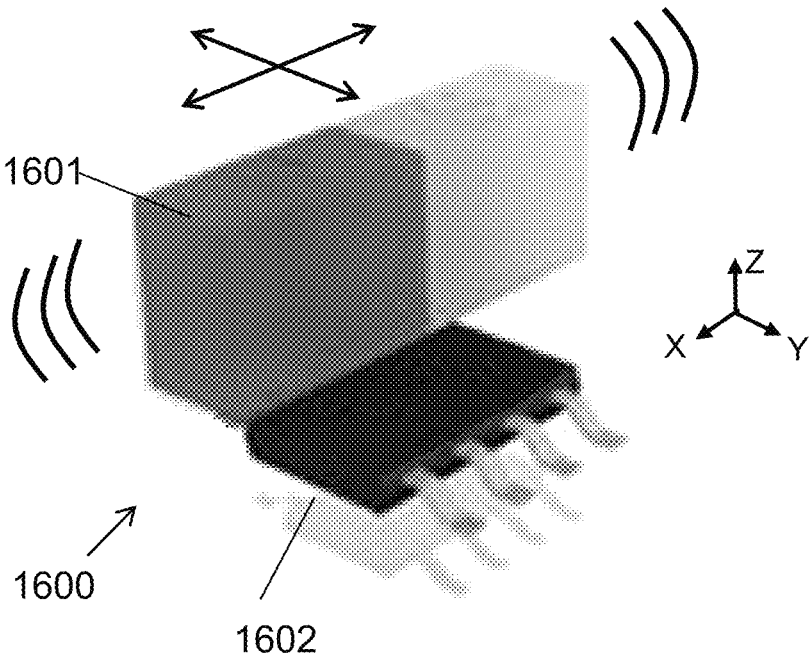
FIG. 16 is a perspective view of a position sensor system having two degrees of freedom. The system comprises a magnet and a sensor device, the magnet is movable in a plane XY relative to the sensor device.
Figure 25:
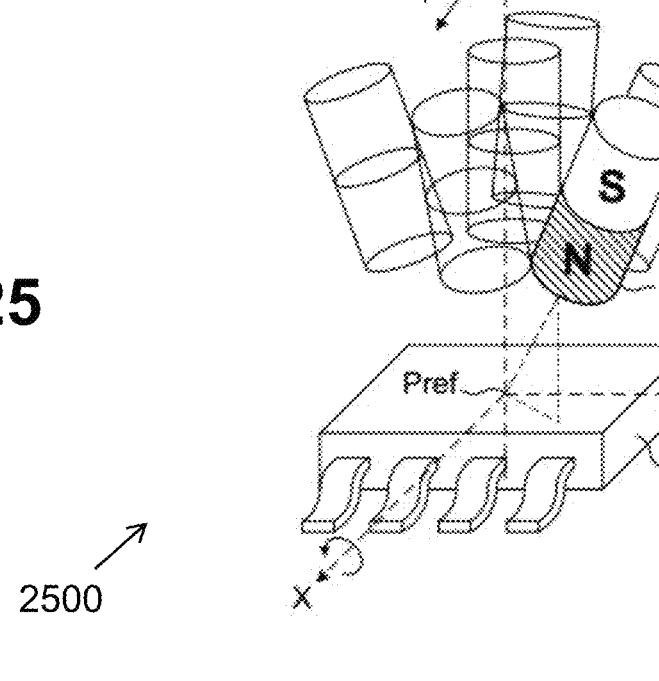
FIG. 25 is a perspective view of a position sensor system having two degrees of freedom, where a magnet is mounted to a joystick, which is movable back/forth and left/right relative to a sensor device about a reference point located on the semiconductor substrate.
Figure 26:
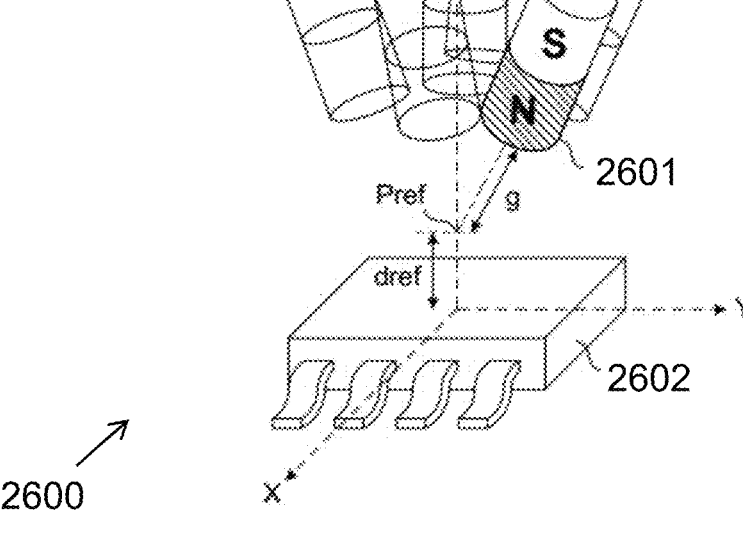
FIG. 26 is a perspective view of a position sensor system having two degrees of freedom, where a magnet is mounted to a joystick, which is movable back/forth and left/right relative to a sensor device about a reference point located above the semiconductor substrate.

FIG. 4A is a high-level block-diagram of a position sensor system proposed by the present invention, configured for determining the position of a sensor device (e.g. the sensor device 102 of FIG. 1) relative to a magnetic source (e.g. the magnet 101 of FIG. 1), or vice versa, for a sensor arrangement having only 1 or only 2 or only 3 degrees of freedom, such as for example the arrangement 100 shown in FIG. 1, or the system 1600 shown in FIG. 16, or the system 2500 of FIG. 25, or the system 2600 of FIG. 26, but the present invention is not limited to these examples. The magnetic source is not shown in FIG. 4A.

The proposed system 400 comprises a plurality of at least two, or at least three, or at least four magnetic sensors. The magnetic sensors may be Hall elements, e.g. horizontal Hall elements, vertical Hall elements, magneto-resistive (MR) elements, or combinations hereof. The system 400 further comprises a "biasing and readout-circuitry" for obtaining signals from the magnetic sensors, e.g. comprising one or more of: a current source, a voltage source, a Wheatstone-bridge, etc. The biasing and readout circuit may be part of a front-end block 403, which may be identical to or different from the front end block 103 of FIG. 2. The block 403 may also comprise at least one amplifier (not shown), and/or provisions for sensitivity-correction of the various sensor elements. The system 400 may also comprise at least one analog-to-digital converter ADC, which may be part of the front end block 403, but does not have to be. The magnetic sensors and the biasing and readout circuit will typically be implemented in a sensor device, e.g. an integrated sensor chip. The sensor device may further comprise a temperature sensor, and the block 403 may be further configured for performing a temperature correction of the measured signals.

According to an important aspect of the present invention, the system 400 comprises a trained Artificial Neural Network (ANN), configured for processing signals obtained from the magnetic sensor elements, and/or signals derived therefrom (e.g. difference signals), and optionally also from a temperature sensor 406. The ANN may be implemented partially in hardware and partially in software, or completely in hardware or completely in software. Part of the ANN may even be implemented in the analog domain, e.g. using a so called hardware accelerator.

In an embodiment, the system 400 comprises an analog hardware accelerator. In this case, the front end 403 may be configured to provide analog signals to the hardware accelerator, and to digitize at least one output of the hardware accelerator using at least one ADC, and to further process these digitized signals using a digital circuit and/or a programmable processor.

In an embodiment, the system 400 comprises a digital hardware accelerator. In this case, the front end 403 may comprise an ADC, and be configured to provide digital signals to the digital hardware accelerator and be configured to further process at least one digital output provided by the hardware accelerator using a digital circuit and/or a programmable processor.

In an embodiment, the system 400 does not comprise a hardware accelerator. In this case, the front end 403 may comprise an ADC, and be configured to provide digital signals to a programmable processor, which performs the algorithm of the ANN completely in software.

Figure 4B:
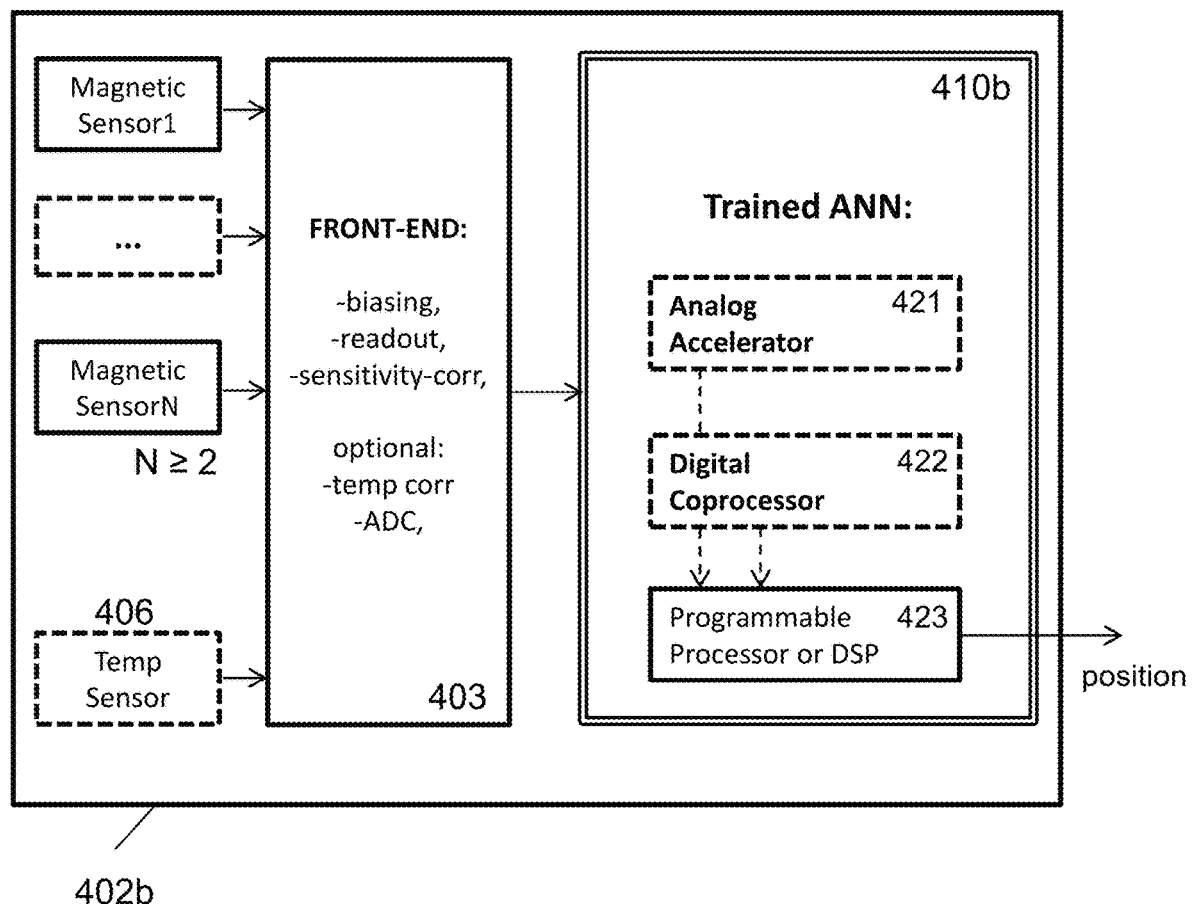
FIG. 4B shows a special case of FIG. 4A, wherein the ANN is implemented inside the sensor device.

From the above, it can be understood that the ANN block 410 may be implemented in various ways, for example:
i) completely inside the sensor device, e.g. using a programmable processor or DSP 423, and using one or more analog hardware accelerator(s) 421 and/or one or more digital coprocessor(s) 422, e.g. as illustrated in FIG. 4B. Of course, the analog accelerator would typically be followed by at least one ADC, and the programmable processor or DSP would typically be connected to volatile memory (e.g. RAM) and non-volatile memory (e.g. Flash), but such details need not be shown.
ii) completely in an external device, e.g. completely in a laptop computer, in a desktop computer, or another processing device external from the sensor device, such as a powerful digital signal processor (DSP), or an ECU, or the like.
iii) partially inside the sensor device and partially outside of the sensor device, e.g. in a laptop computer, in a desktop computer, or another processing device external from the sensor device, such as a powerful digital signal processor (DSP), or an ECU, or the like.
The programmable processor may be integrated in the same semiconductor substrate as the sensor elements or may be a separate chip mounted on the same printed circuit board (PCB) as the sensor device, and communicatively connected thereto.

In some embodiments, the sensor device comprises a temperature sensor, but the temperature correction is not performed by the front-end, but is performed by the ANN. In this embodiment, a single neural network is thus used for performing (1) temperature correction of the magnetic sensor signals, and also for (2) determining a position of the sensor device relative to the magnetic source (or vice versa).

In all embodiments of the present invention, the system 400 uses an artificial neural network (ANN) 410 trained for determining a 1D or a 2D or a 3D position, based on signals obtained from magnetic sensors and/or signals derived therefrom, and optionally also based on a temperature signal.

While not explicitly shown in FIG. 4A, when the ANN 410 is performed by an external device, of course the sensor device and said external device would have to be communicatively connected, e.g. using a wired interface or a wireless interface. Any suitable interface can be used to establish such communication. Such interfaces are well known in the art, and are not the main focus of the present invention, and are therefore not described in more detail.

FIG. 5A to FIG. 5F schematically illustrate various examples of generating "training data" that may be used for training the artificial neural network of FIG. 4A, based on computer simulations.

The examples given assume that the sensor device has four horizontal Hall plates, providing signals Bz1, Bz2, Bz3, Bz4, but as already mentioned above, the present invention is not limited thereto, and may have less than four or more than four sensor elements, and/or may use other magnetic sensor elements, or a mixture of magnetic sensor elements. The number, the type and the location of the sensor elements in the simulation has to correspond with the actual number, type and locations of the sensor elements in the sensor device. A few examples are shown in FIG. 8A to FIG. 8F.

The present invention proposes to use a recurrent neural network (RNN). The RNN is trained with a relatively large set of "training data". The "training data" can be seen as a list (or file, or sequence) of groups or sets of corresponding values (also referred to as "frames"). A frame for a 1D position sensor system, wherein the sensor device comprises four horizontal Hall elements, may consist of 5 values: (X, Bz1, Bz2, Bz3, Bz4), wherein X is the position of the sensor device, and Bz1 to Bz4 are the values (or signals) obtained from the four magnetic sensor elements for said position.

The values for the positions X are not randomly chosen, but are chosen assuming that the sensor device follows a certain "trajectory". Several examples of 1D trajectories are illustrated in FIG. 12(a) to FIG. 12(g), referred to herein as: "constant speed", "teleport", "sine", "flat top", "bouncing", "sharp top", and "step" respectively. The trajectories may be continuous and change relatively smoothly, or may change abruptly. For the 1D position sensor system, a "trajectory" can thus be represented by a list (or file) of positions (e.g. X) that the sensor assumes at various moments in time. In the example of FIG. 12(a) to FIG. 12(g) each trajectory contains one hundred thousand samples (also written as 100 K), but that is not absolutely required, and trajectories with a smaller or larger number of positions will also work. During some experiments a training set of 100K frames was used, during other experiments 64K frames were used to train the network. Both provided adequate results, but of course, the present invention is not limited hereto, and in certain embodiments the neural network of a position sensor system with only 1 degree of freedom may be trained with a training set containing a different number of frames, e.g. from one thousand (1K) to ten million (10M) frames, or from ten thousand (10K) to one million (1M) frames, or from twenty thousand (20K) to five hundred thousand (500K) frames, or from fifty thousand (50K) to two hundred thousand (200K) frames.

For each position X, the values Bz1, Bz2, Bz3, Bz4 that the magnetic sensors of the envisioned sensor device having a particular size and sensor arrangement would measure when the sensor device is at that position, can be determined for example by a simulation tool.

Figures 5A, 5B, 5C, 5D:
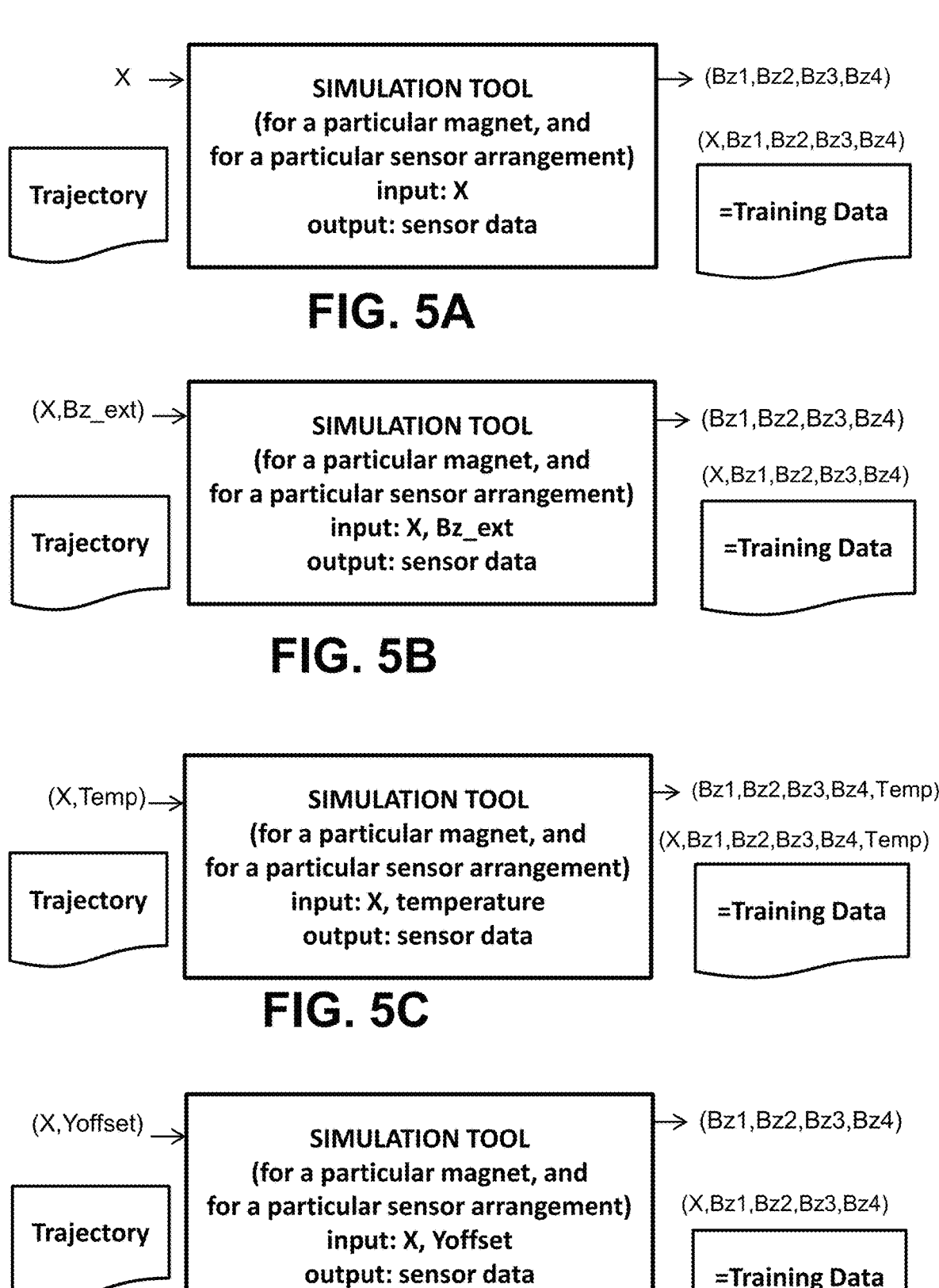
FIG. 5A to FIG. 5F, and FIG. 6A to FIG. 6C schematically illustrate various examples of generating training data that may be used in embodiments of the present invention, e.g. for training the artificial neural network of FIG. 4A or FIG. 4B.

In the example of FIG. 5A, the neural network is "only" trained to detect the position X, based on measured sensor signals, and thus the network is not explicitly trained for an external disturbance field, temperature variations, a lateral offset, a height offset, random noise, or combinations hereof. In other words, the simulation tool of FIG. 5A would assume for example that the magnet generates a magnetic field as illustrated in FIG. 3A, that the value of Y (lateral offset) is exactly equal to 0.0 mm, that the value of Z (height) is exactly equal to 5.0 mm, that the magnetic external disturbance field (Bext) is exactly equal to zero, that the temperature is constant, and that there is no random noise, but in practice these assumptions are only approximately true due to various reasons such as mounting tolerances, environmental effects, etc. This the most simple example, and provides "basic functionality". The basic idea is to train the neural network such that it can provide an accurate value of the position based on the measured sensor data.

In the example of FIG. 5B, the simulation tool allows to input not only values for the position X, but also for an external magnetic disturbance field. In case the sensor device only contains horizontal Hall elements, only the Bz component of the external disturbance field is relevant: Bz_ext. It is assumed that the magnetic disturbance field, if present, is a homogeneous field, meaning that the disturbance is the same for all sensor locations. Since the values of Bz_ext is not explicitly measured by the sensor device, its value is not explicitly stored in the training data file, but the values of Bz1 to Bz4 are changed because of the external disturbance field. In an embodiment, the trajectory file contains a plurality of sub-trajectories, e.g. in the range from 2 to 1024 sub-trajectories, or from 2 to 512 sub-trajectories, or from 2 to 256 sub-trajectories, or from 2 to 128 sub-trajectories, or from 2 to 64 sub-trajectories, or from 2 to 32 sub-trajectories, or from 2 to 16 sub-trajectories, or from 2 to 8 sub-trajectories, or from 2 to 4 sub-trajectories. The X-values of each sub-trajectory may be as or similar to the trajectories illustrated in FIG. 12(a) to FIG. 12(g), and the value of the external disturbance field Bz_ext along this sub-trajectory may be constant. But different sub-trajectories would have different values for the external disturbance field Bz_ext. The idea is to train the neural network such that it can provide an accurate value of the position, based on the sensor data, even in the presence of an external disturbance field; and thus that a position sensor system using such a neural network is robust or more robust against an external disturbance field.

In the example of FIG. 5C, the simulation tool allows to input not only values for the position X, but also a temperature value, e.g. a temperature of the semi-conductor substrate. In an embodiment, a single temperature on the semiconductor substrate is measured, and the simulation assumes that the temperature distribution over the semiconductor surface of the sensor device is "stable". It is noted that this assumption allows that the temperature is different at the various sensor locations. Since the value of the temperature is explicitly measured by the sensor device, its value "Temp" is added to the training data file as an additional input. In an embodiment, the trajectory file contains a plurality of sub-trajectories, e.g. in the range from 2 to 1024 sub-trajectories, or 2 to 512, or 2 to 256, or 2 to 128, or 2 to 64, or 2 to 32, or 2 to 16, or 2 to 8, or 2 to 4. The X-values of each sub-trajectory may be as or similar to the trajectories illustrated in FIG. 12(A) to FIG. 12(G), and the value of the temperature Temp along this sub-trajectory may be constant. But different sub-trajectories would have different values for the temperature. The idea is to train the neural network such that it can provide an accurate value of the position, based on the sensor data, even if the temperatures of the semiconductor substrate varies; and thus that a position sensor system using such a neural network is robust or more robust against temperature variations.

In the example of FIG. 5D, the simulation tool allows to input not only values for the position X, but also values for lateral offset. Since the sensor device cannot measure the lateral offset itself, the value of Yoffset is not explicitly added to the training data, but is "incorporated" into the Bz-values. In order to cope with various lateral offset-values, an approach with a plurality of sub-trajectories can be applied here as well. The idea is to train the neural network such that it can provide an accurate value of the position, based on the sensor data, even in case of a lateral mounting offset; and thus that a position sensor system using such a neural network is robust or more robust against mounting tolerances.

Figure 5E:
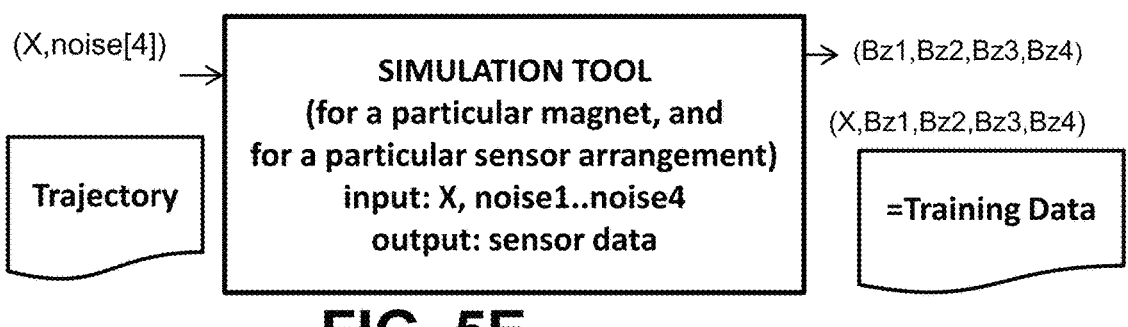

In the example of FIG. 5E, the simulation tool allows to input not only values for the position X, but also values for noise. The idea behind this embodiment is to try to train the neural network to cope with random noise, or pseudo-random noise, as will occur for example with Hall sensors. Since the noise will typically be different for each sensor and for each moment in time, the simulation tool may take as input five values: one for the position X, and one noise value for each sensor element. It is of course also possible to implement the noise addition in the simulation tool itself. In an embodiment, the amplitude of the noise is predefined, and is the same for all sensors. In another embodiment, the amplitude of the noise is dependent (e.g. proportional) to the signal measured by the particular sensor element. The idea is to train the neural network such that it is more robust against noise.

Figure 5F:
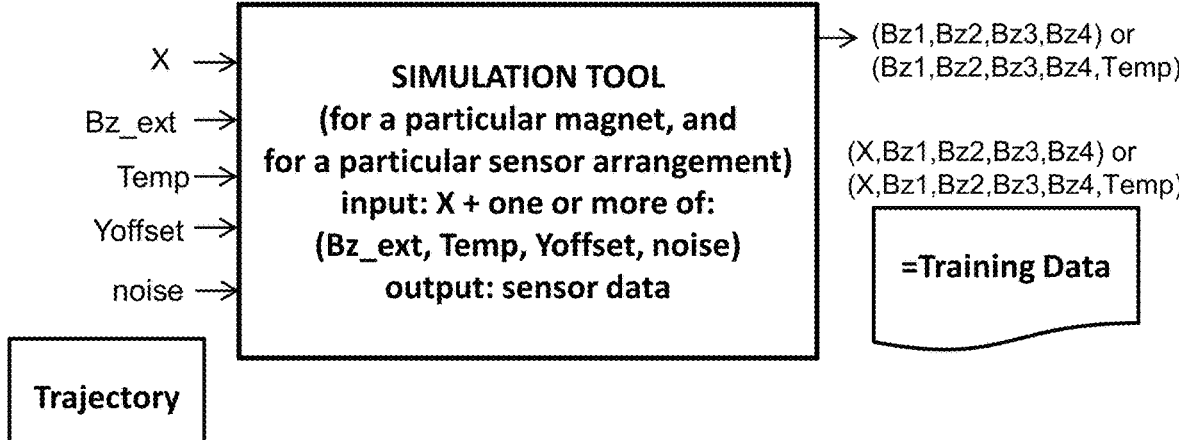

Various non-idealities (e.g. external disturbance field, temperature variations, lateral offset, noise, etc.) may also be combined, as illustrated in FIG. 5F.

Alternatively, or additionally, the neural network may be trained with a combination (e.g. the sum) of the various "training data files" obtained from FIG. 5A to FIG. 5E, or any subset thereof.

Figure 6A:
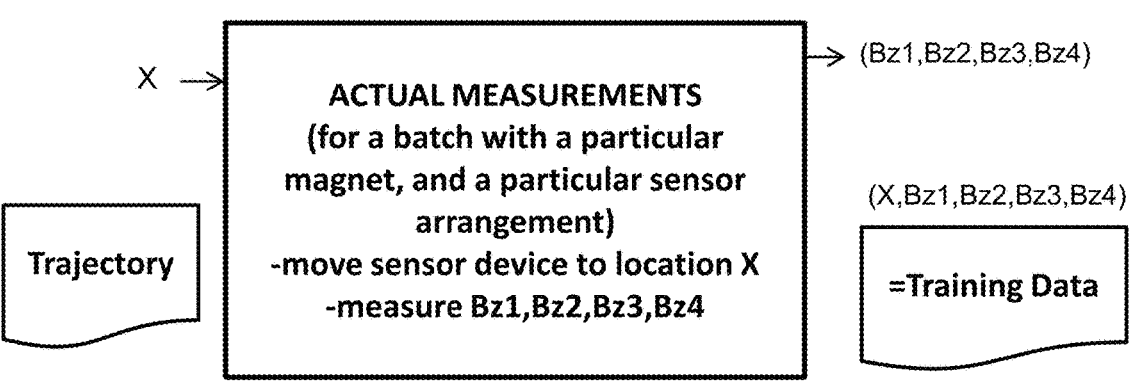
Figure 6B:
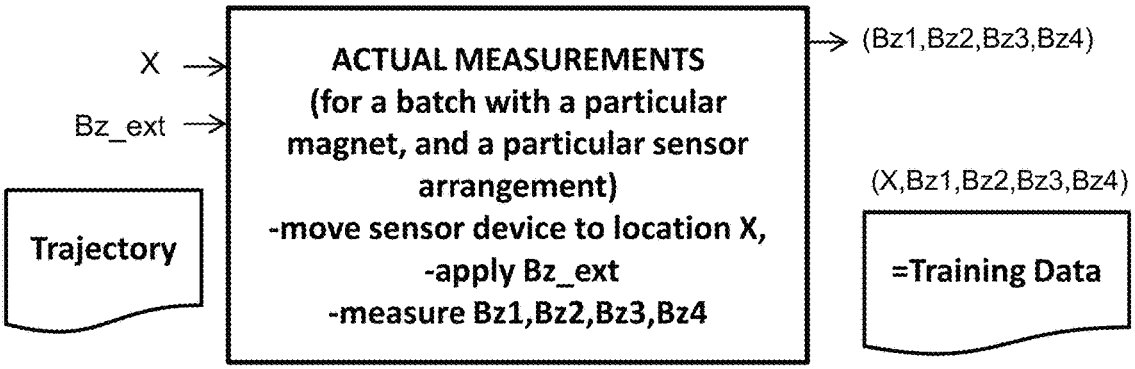
Figure 6C:
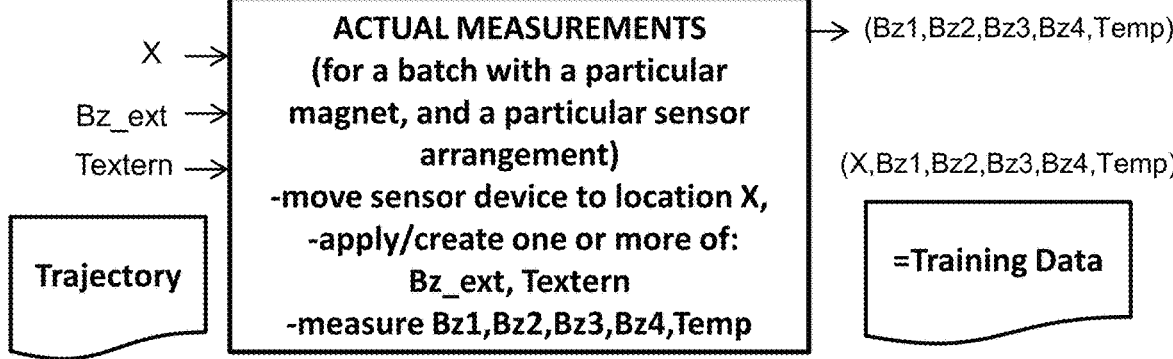

FIG. 6A to FIG. 6C illustrate that training data can also be generated by performing actual measures in a test-setup, instead of, or in addition to using a computer simulation. It is noted that actual measurements automatically include noise.

FIG. 6A shows a relatively simple example wherein a sensor device is physically moved to known positions X relative to a magnet, and the values measured by the sensor are output and stored in a file, along with the position X. In an experiment the sensor device was physically moved to two thousand (2K) different positions over a 5 mm distance (from −2.5 mm to +2.5 mm) for training the neural network, and the results were good.

FIG. 6B shows a slightly more complicated example wherein furthermore a magnetic disturbance field is applied to the sensor. As described above in relation to FIG. 5B, the sensor device may be moved to follow a plurality of sub-trajectories, and a different magnetic disturbance field (e.g. Bz_ext) may be applied for each of these sub-trajectories.

FIG. 6C shows an even more complicated example, wherein furthermore the external temperature of the sensor device is varied.

In an example of FIG. 6C, the positions are varied, and the temperature is varied, but no external disturbance field is applied.

In an example of FIG. 6C, the positions are varied, and an external disturbance field is applied, but the temperature is kept constant.

In an example of FIG. 6C, the positions are varied, and an external disturbance field is applied, and the temperature is varied.

It is of course also possible to combine training data obtained by simulation, and training data obtained by actual measurement.

It is noted that "obtaining real measurement data" from sensor elements of a sensor device", can be obtained by physically moving a sensor device relative to a stationary magnet, but can also be obtained by using a test-device with a plurality of coils (sometimes also referred to as a "3D coil system", e.g. as described in EP3621091(A1), incorporated herein by reference, which emulates the magnetic field that would be experienced by the sensor element if the sensor device would be at particular position relative to a particular magnet. Generating a magnetic field by means of coils offers the advantage that the sensor device can remain stationary, and that fine mechanical movements can be replaced by control of the currents flowing through the respective coils of the test-device.

In a particular embodiment, the artificial neural network is trained using training data, derived from raw measured signals obtained from magnetic sensor elements from a plurality of sensor devices (e.g. at least 5, or at least 10, or at least 20, or at least 50, or at least 100 sensor devices), and information obtained from a temperature sensor present in these sensor devices (e.g. incorporated on the same semiconductor substrate as the magnetic sensor elements), measured under various ambient temperatures (e.g. in 20° C. increments), when the sensor device is mechanically positioned at various locations relative to a permanent magnet (e.g. in 1% increments of a predefined measurement range), or when the sensor device is placed in a test-device or a "3D coil system", where a magnetic field is generated at the sensor locations, by controlling a plurality of currents.

In a variant, not only a plurality of sensor devices is used to obtain raw measured data, but also a plurality of permanent magnets is used. This offers the advantage that also imperfections (or production tolerances) of the magnet are taken into account.

The raw measured data is preferably interpolated to increase the spatial resolution, and may optionally be smoothed or low-pass-filtered.

The plurality of sensor devices may be obtained from a single wafer, or may be obtained from multiple wafers, for example from a plurality of wafers from a same production lot; and/or for example from different "corner wafers" (i.e. wafers produced with different "process corners"). The plurality of sensor devices used to train the neural network may for example comprise sensor devices obtained from at least 3 different corner wafer known as TT (typical-typical), SS (slow-slow), and FF (fast-fast), where the first letter refers to NMOS characteristics, and the second letter refers to PMOS characteristics.

Alternatively or additionally, the sensor devices may be obtained from different locations of the one or more wafers.

As an example, 5 chips per wafer may be be used, e.g. 1 chip comprising a substrate portion that was located at the centre of the wafer, and 4 chips comprising a substrate portion that was located near the edges.

After the artificial neural network is trained, the resulting training parameters can then be stored e.g. in a non-volatile memory of the particular devices that were measured, and also stored in other devices comprising a substrate portion obtained from the same wafers (as the devices that were actually measured), and also stored in other devices from other wafers of the same production lot.

The training parameters may be determined for each production lot, or the same parameters may also be stored in (e.g. in a non-volatile memory) of sensor devices comprising a substrate portion obtained from wafers from other production lots.

Figure 7:
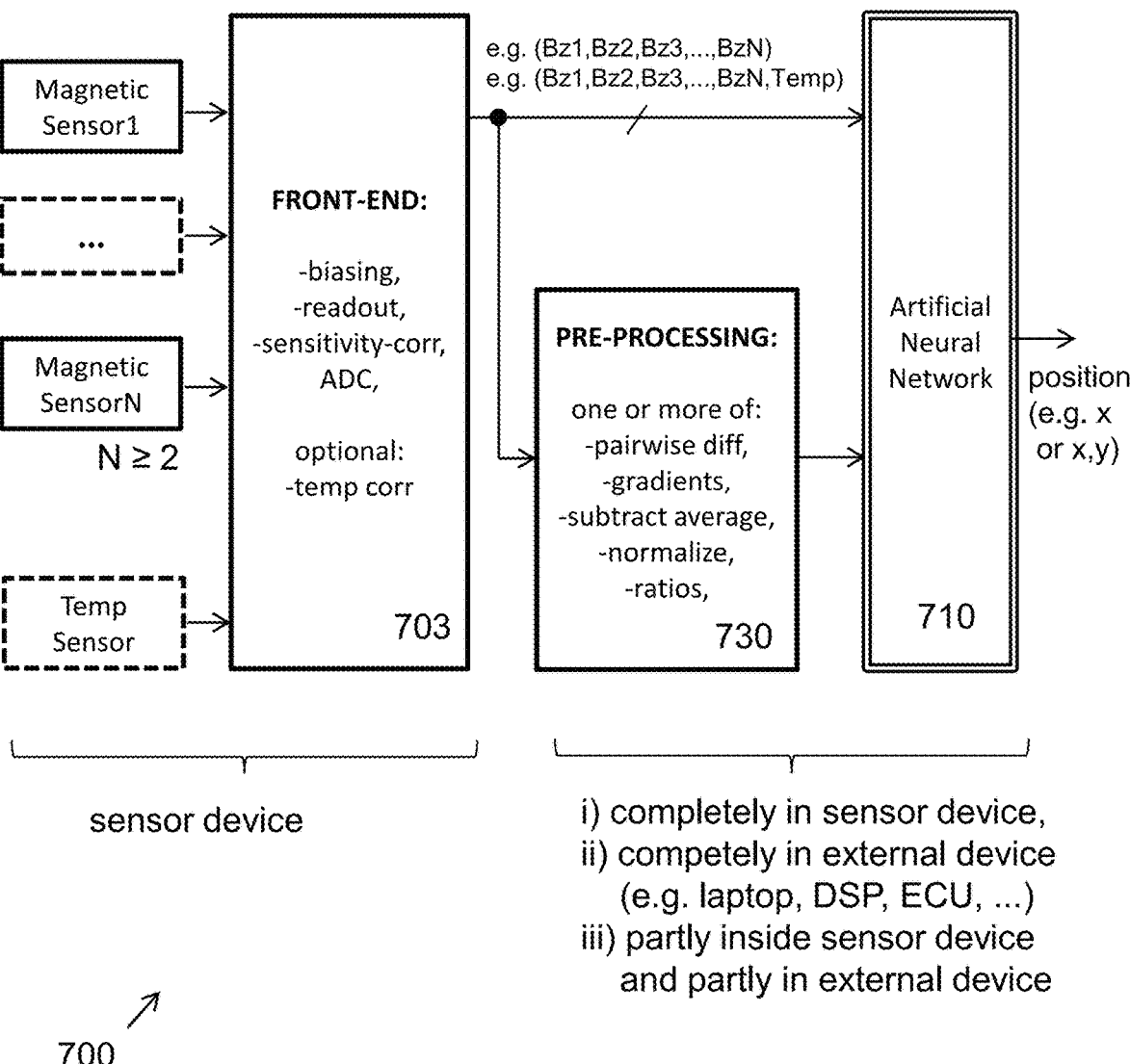
FIG. 7 shows a variant of the block-diagram of FIG. 4A, wherein additional signals are derived from the measured signals, and wherein these additional signals are also fed into the ANN.

FIG. 7 shows a block-diagram of position sensor system 700 which can be considered a variant of the block-diagram of FIG. 4A, further comprising a "pre-processing" block 730, configured for receiving one or more or all of the measured signals, and configured for generating "additional signals" (e.g. pairwise difference signals, gradient signals, an average signal, a difference between a measured signal and the average signal, a ratio of measured signals, a ratio of difference signals, a ratio of gradients, a normalized signal, and the like), and for providing one or more or all of these additional signals to the Artificial Neural Network 710.

As an example of a sensor device having four horizontal Hall elements H1 to H4, the normalized signals may be determined in accordance with the following set of formulas:

$$\text{sum}=h1+h2+h3+h4;$$

$$a1=h1/\text{sum};$$

$$a2=h2/\text{sum};$$

$$a3=h3/\text{sum};$$

$$a4=h4/\text{sum};$$

wherein sum is the sum-signal, h1 to h4 are the signals obtained from the Hall sensors H1 to H4 respectively, a1 is a normalized version of h1, a2 is a normalized version of h2, etc. The signals sum, a1, a2, a3, a4 are additional signals which can be fed into the ANN.

The neural network 710 of FIG. 7 receives more input signals than the neural network 410 of FIG. 4A, and thus needs to be trained with other training data. The training data described in FIG. 5A to FIG. 6C can also be used here, but needs to be extended with additional information. An extended version of the training data of FIG. 5A to FIG. 6C may comprise a plurality of frames containing the following values: (x, Bz1, Bz2, Bz3, Bz4, sum, a1, a2, a3, a4) or containing the following values: (x, Bz1, Bz2, Bz3, Bz4, Temp, sum, a1, a2, a3, a4)

In another example of a sensor device having four horizontal Hall elements H1 to H4, the additional data may be determined in accordance with the following set of formulas:

$$a1=(h1-h2);$$

$$a2=(h3-h4);$$

$$a3=a1/a2;$$

and the training data may comprise a plurality of frames containing the following values: (x, Bz1, Bz2, Bz3, Bz4, a1, a2, a3) or (x, Bz1, Bz2, Bz3, Bz4, Temp, a1, a2, a3), where Temp is a measured temperature value, e.g. a temperature of the semiconductor substrate.

But of course the present invention is not limited to these examples.

As another example, in case the sensors are 3D magnetic pixels measuring Bx, By, Bz at each sensor location, a sum of squares may be determined as sum=(Bx*Bx)+(By*By)+(Bz*Bz), and three additional signals may be calculated for example as: a1=Bx/sum; a2=By/sum; a3=Bz/sum.

The pre-processing block 730 may be implemented in the analog domain, in the digital domain, or partly in the analog domain (e.g. pairwise subtraction) and partly in the digital domain (e.g. calculating a ratio). Depending on the implementation, the pre-processing block 730 may comprise an analog to digital convertor (ADC), an arithmetic or logical unit (ALU), etc.

Using a pre-processing block 730 in front of the ANN may yield more accurate results.

FIG. 8A to FIG. 8F show a few examples of sensor arrangements as may be used in embodiments of the present invention, but of course the present invention is not limited to these examples. Results of position sensor systems using these sensor arrangements, and variants thereof, will be discussed further. In the examples shown in FIG. 8A to FIG. 8F, the sensor devices contain only horizontal Hall elements, without flux concentrators. Two different die sizes (or "grid sizes") were simulated: a first die size having an area of about 1.0 mm×1.0 mm, a second die having an area of about 0.5 mm×0.5 mm, but of course, the present invention is not limited thereto, and other die sizes or grid sizes may also be used. Various numbers of Hall elements in various arrangements were simulated, for example: 1×2 on a horizontal line (see e.g. FIG. 8A), 1×4 on a horizontal line as two pairs (see e.g. FIG. 8B), 1×4 on a diagonal equidistantly (see e.g. FIG. 8C), on the 4 crossings of a regular 2×2 grid (see e.g. FIG. 8D), on the 9 crossings of a regular 3×3 grid (see e.g. FIG. 8E), 9 pseudo-random locations (see e.g. FIG. 8F), but the present invention is not limited to these examples, and other topologies can be used, as well as other sensor elements (e.g. vertical Hall elements, MR elements, 2D magnetic pixels, 3D magnetic pixels, etc.)

Figures 8A, 8B, 8C, 8D, 8E, 8F:
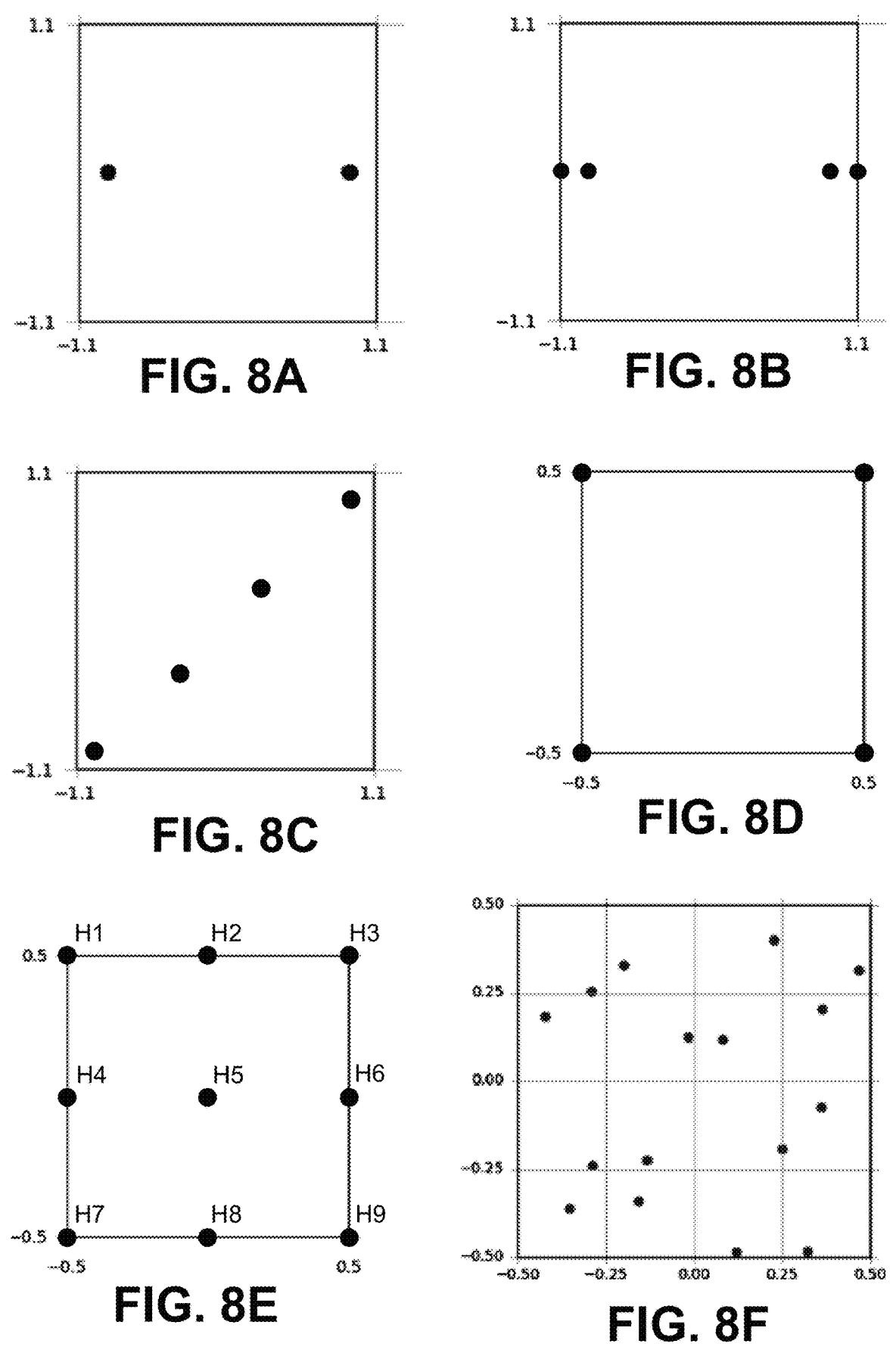
Figure 9A:
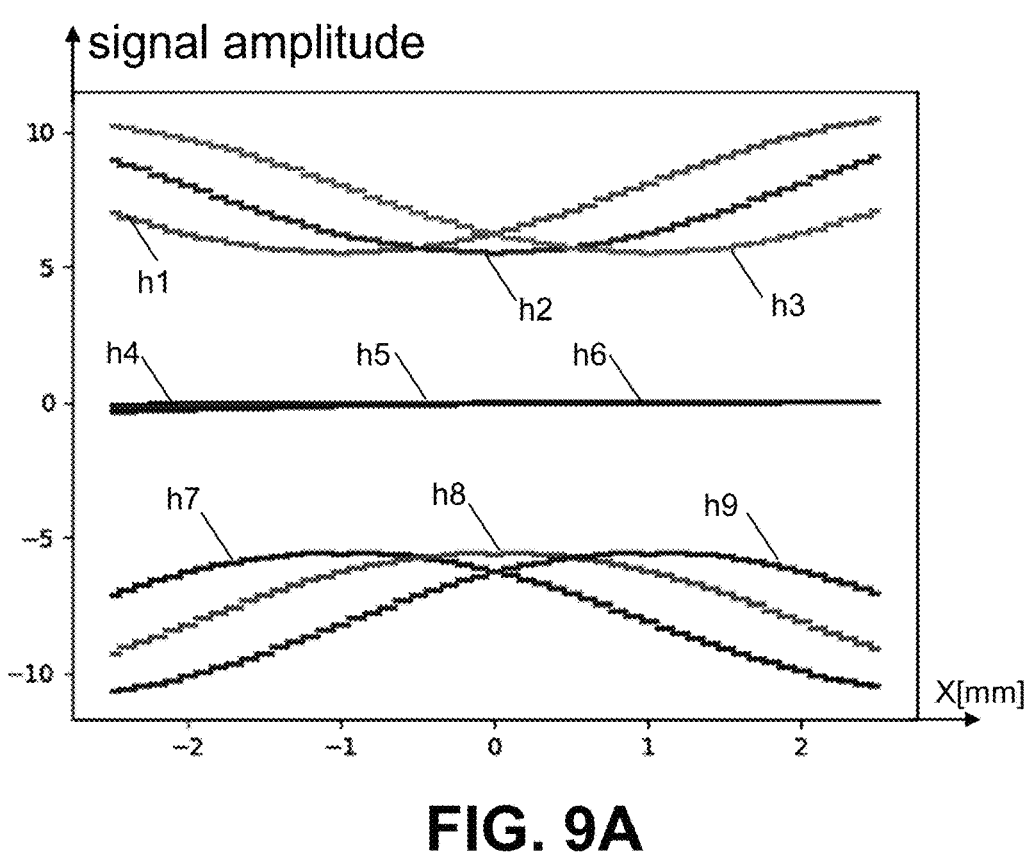
FIG. 9A shows a plot with several waveforms representing signal amplitude as a function of the position of the sensor device, as may be measured by the sensor elements of FIG. 8E when used in the position sensor system of FIG. 1.

FIG. 9A shows a plot with the simulated signal waveforms of the signals h1 . . . h9 as would be measured by the sensor elements H1 . . . H9 of the sensor device shown in FIG. 8E, when moving along the X-axis. As can be seen, the signals h4, h5 and h6 are close to zero, hence the locations of the sensor elements H4, H5, H6 for this particular sensor system is a rather poor choice. This example shows that using more Hall elements does not necessarily imply that the results will be more accurate, if their positions are poorly chosen.

Figure 9B:
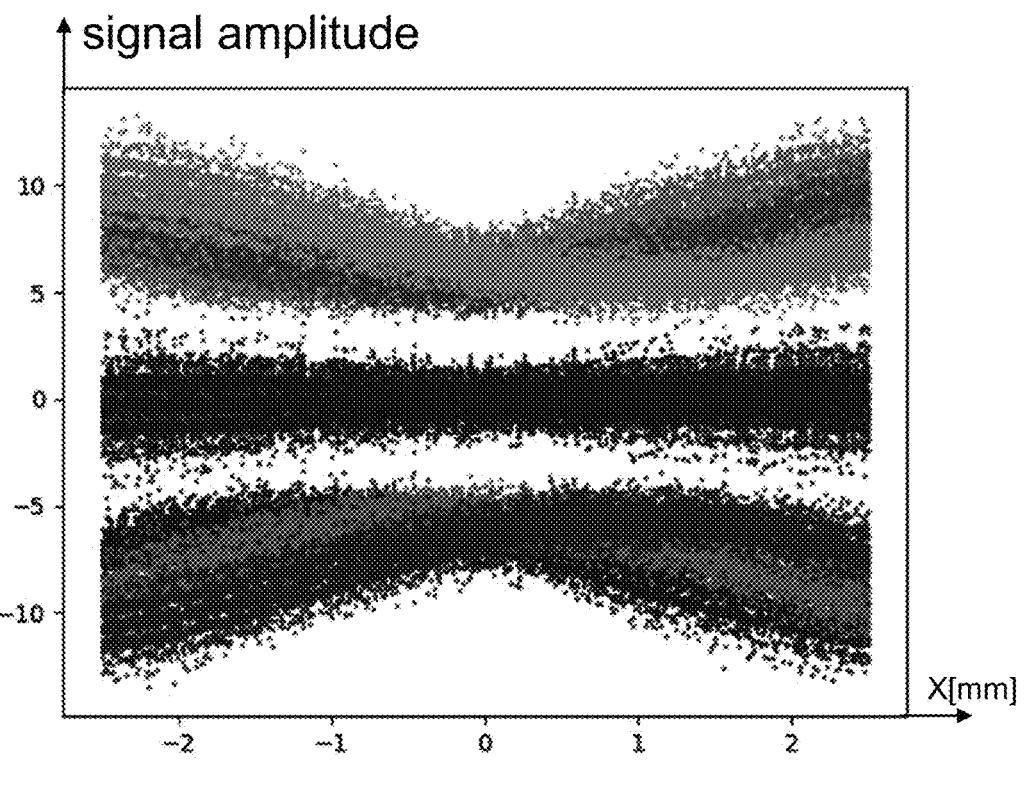
FIG. 9B shows the signals of FIG. 9A with added Gaussian noise.

FIG. 9B shows the simulated signals of FIG. 9A with artificially added noise, e.g. Gaussian noise. Simulations have surprisingly shown that the accuracy of the predicted location X may in fact be slightly improved when the ANN is trained with data containing added noise. This was very surprising.

Figure 10A:
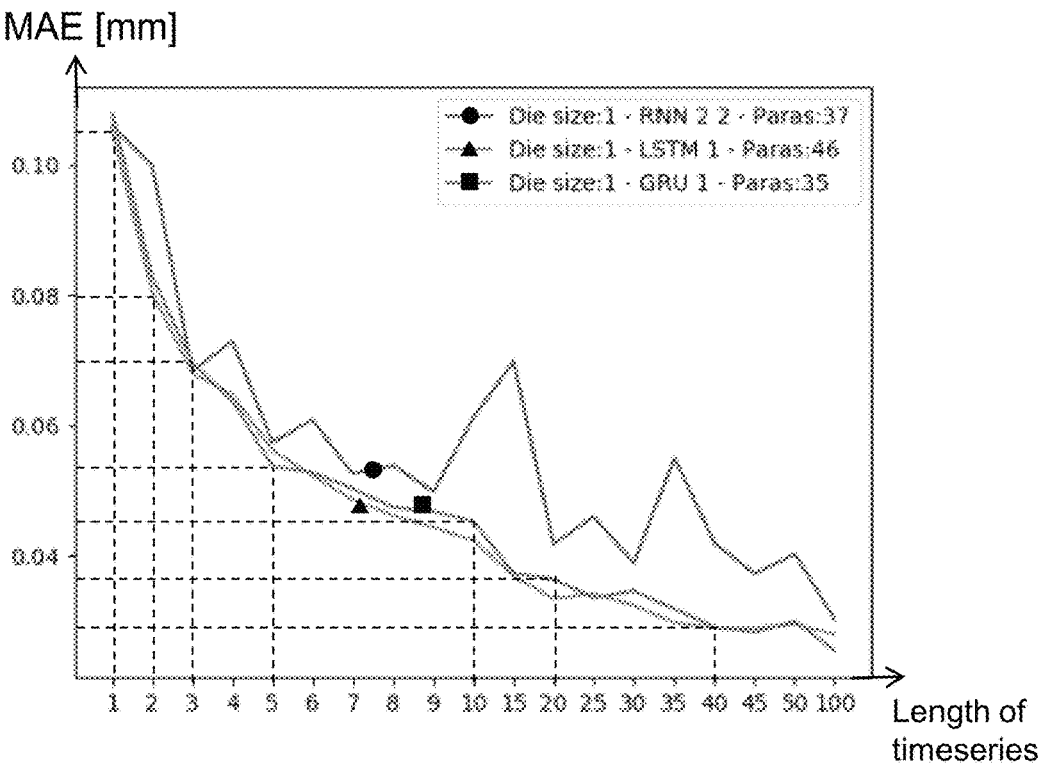
FIG. 10A shows a graph illustrating an influence of the length of the time-series of the recurrent neural network on the mean absolute error for a linear position sensor, in stateless mode.

FIG. 10A shows a graph illustrating an influence of the "length of the time-series" of several recurrent neural networks (RNN) on the mean absolute error (MAE in mm) of a linear position sensor system as shown in FIG. 1A, when using a sensor device having an area of 1.0 mm×1.0 mm, and having 3×3=9 horizontal Hall elements, arranged as shown in FIG. 8E.

Three plots are shown: a first plot (indicated with a black circle) using an RNN 2 2 architecture (2 layers each having 2 components) with 37 trainable parameters, a second plot (indicated with a black triangle) using an LSTM 1 architecture (1 layer with 1 component) with 46 trainable parameters; a third plot (indicated by a black square) using a GRU 1 architecture (1 layer with 1 component) with 35 trainable parameters.

It is noted that neural networks having a Recurrent Neural Network (RNN) architecture, a "Long Short-Term Memory" (LSTM) architecture and a "Gate Recurrent Unit" architecture, as well as methods for training them using Deep Learning techniques are know per se in the art of artificial neural networks, but as far as known to the inventors, such networks are not used in the field of magnetic position sensor systems. Yet, as can be appreciated from FIG. 10A, the absolute error of the position determined (or predicted or estimated) by the artificial neural network can surprisingly be reduced by increasing the "length of the time-series" of the Recurrent Neural Network. Furthermore, and this came as another big surprise, the number of trainable parameters for such networks can be surprisingly low, especially when compared to neural networks for facial recognition, voice recognition, handwriting recognition, etc. requiring tens or even hundreds of thousands of trainable parameters. It is noted in this respect that there is a common believe that artificial networks need a huge number of trainable parameters, and require considerable resources in terms of CPU power, and memory requirements, which make them unsuitable or prohibitively expensive for applications such as "positioning sensor systems" for automotive, industrial or robotic applications.

As can be seen from FIG. 10A, a "time-series with a length of 2" already provides some improvement, a time-series having a length of at least 5 may reduce the mean absolute error (MAE) by a factor of about 2, but time-series having a length of at least 10 or at least 20 can also be used.

Other simulations were performed, in order to test the influence of other parameters, such as die size, and number of Hall elements. For these simulations, a time-series of length equal to 50 was used (indicated herein by "t50") in order to get the "best possible" results, and/or to reduce the influence of the time-series length as much as possible. This does not mean, however, that in practical implementations, a time-series of 50 needs to be required, but a time-series having a length of 5 or even smaller, e.g. 4 or 3 or 2 may also be used.

For completeness, it is noted that recurrent networks (RNN) can work in either stateless mode, or in stateful mode. "Stateless mode" means that the network resets its internal states after a given time-series. In this case, the network needs to be fed an entire time-series, and the length of the time-series matters. In "stateful mode" a new prediction is produced for each new "frame", and the internal states are not reset after the time-series. In this case, the input of the NN is not a time-series of multiple frames, but only a single frame. For this mode, the time-series length is not applicable.

In preferred embodiments, the RNN is configured to work in stateful mode.

Figure 10B:
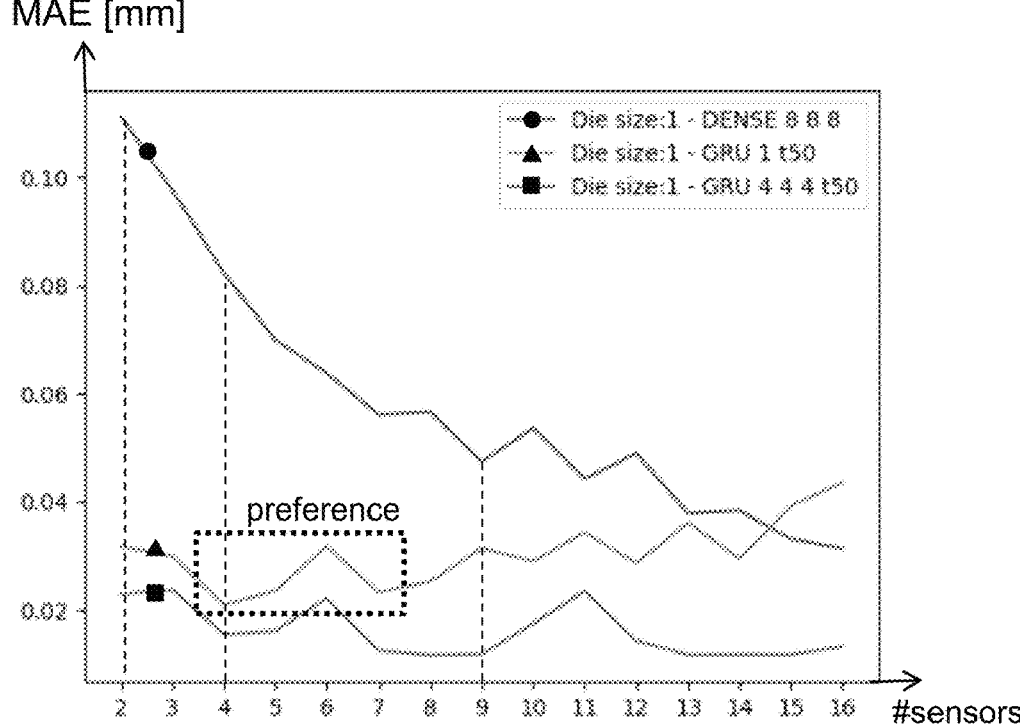
FIG. 10B shows a graph illustrating an influence of the number of Hall elements on the mean absolute error.

FIG. 10B shows a graph illustrating the influence of the number of Hall elements on the mean absolute error (MAE). These simulations are performed for a sensor device having a die size of 1.0 mm×1.0 mm.

Three plots are shown: a first plot (indicated with a black circle) using a Dense 8 8 8 architecture (i.e. a RNN with 3 hidden layers, each comprising 8 fully connected nodes), a second plot (indicated with a black triangle) using a GRU 1 architecture (i.e. a single GRU component) having a time-series of length 50 (t50); and a third plot (indicated by a black square) using a GRU 4 4 4 architecture (i.e. a RNN with 3 hidden layers, each comprising 4 fully connected nodes, each node comprising a GRU-component).

This graph can be interpreted as follows:

1) When using a dense neural network having 3 fully connected hidden layers, the mean absolute error (MAE) typically decreases when the number of sensor elements increases. (this was intuitively expected).

2) The MAE-curve for a "GRU 1 t50" architecture, has very surprising characteristics:
   a) the MAE for the GRU-architecture is a factor of about 3 times lower than the MAE of the dense network, (when using 2 or 3 sensor elements);
   b) the MAE for the GRU-architecture has a minimum when using four sensor elements;
   c) the MAE for the GRU-architecture seems to be quite independent of the number of sensor elements (when using only 4 to 9 sensor elements), and even seems to increase when using more than 7 Hall elements.

3) The MAE curve for the "GRU 4 4 4 t50" architecture, only provides a small improvement with respect to the "GRU 1 t50" architecture but is much more complex in terms of hardware and software resources.

From the above, it can be concluded that the "GRU 1 t50" architecture in combination with a sensor device having 2 to 9 sensor elements, preferably having 4 to 7 sensor elements, seems to be the best solution in terms of "high accuracy" and "low complexity". Taking into account the conclusions of FIG. 10A, that the MAE of an neural network with a "GRU 1 architecture" does not dramatically increase when the length of the time-series is reduced to a value of at least 5, the same conclusion applies to a "GRU 1" architecture using a time-series of at least 5.

Figure 10C:
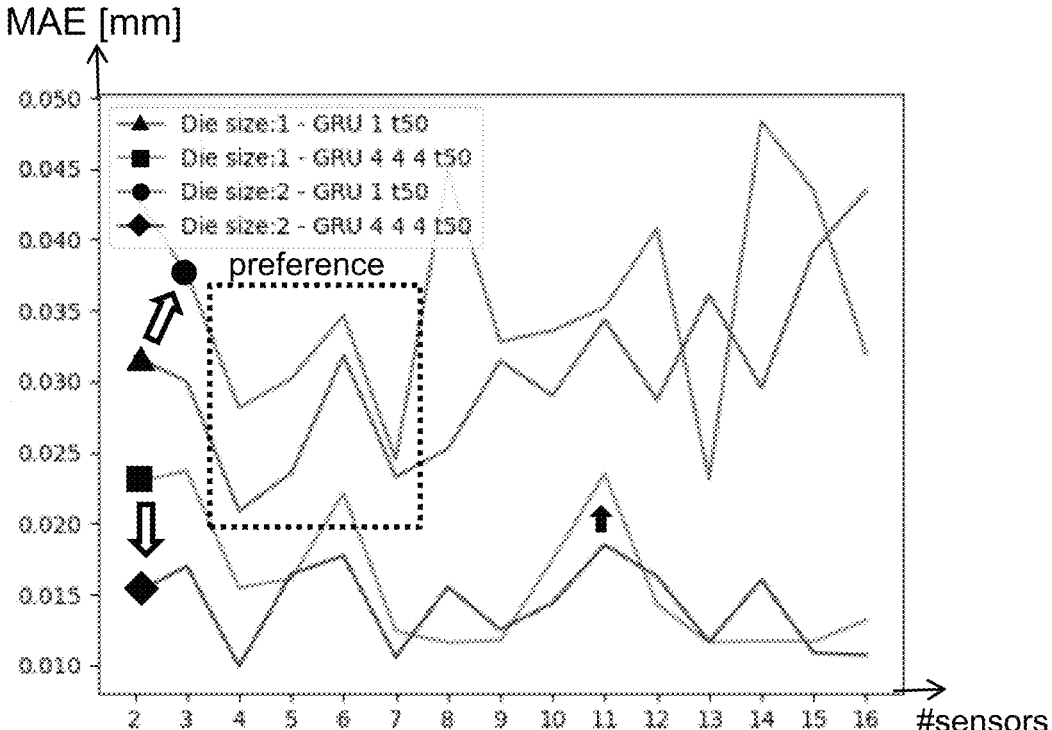
FIG. 10C shows a graph illustrating an influence of the die size on the mean absolute error.

FIG. 10C shows a graph illustrating the influence of the die size on the mean absolute error (MAE). In this plot, "die size 1" has an area of 1.0 mm×1.0 mm, and "die size 2" has an area of 0.5 mm×0.5 mm. The simulations were done for two of the three architectures that yielded the smallest MAE in FIG. 10B, namely "GRU 1 t50" and GRU 4 4 4", in order to see how these curves would change when the die size is decreased. It is noted that the curves with the black triangle and the black square of FIG. 10C are the same as those of FIG. 10B, but a different vertical scale is used.

As can be seen in FIG. 10C, the MAE-curve with the black triangle for the "GRU 1 t50" architecture will shift slightly upwards, (i.e. the MAE will slightly increase) when the die size is decreased from 1.0 mm 2 to 0.25 mm², but the MAE is typically worsened only by a factor of about 1.5.

The MAE-curve with the black square for the "GRU 4 4 4 t50" architecture, does not seem to be much influenced by the die size either. According to the plot, the MAE seems to increase for certain points, and decrease for other points, but as mentioned above, this may be due to the fact that the position of some of the sensor elements may be a bit unfortunately chosen.

Not surprisingly, the MAE curves with the black square and the black diamond for the "GRU 4 4 4 t50" are below the MAE curves with the black triangle and the black circle for the "GRU 1 t50" architecture, but the network complexity of the latter is much, much simpler.

It is also interesting to see that the accuracy does not decrease by the same factor as the scaling factor of the die size area, but the price of a silicon die typically does. This allows a skilled person to make a trade-off between die size and accuracy.

From the above, it can be concluded that the die size is not critical for the invention to work.

Figures 11A, 11B:
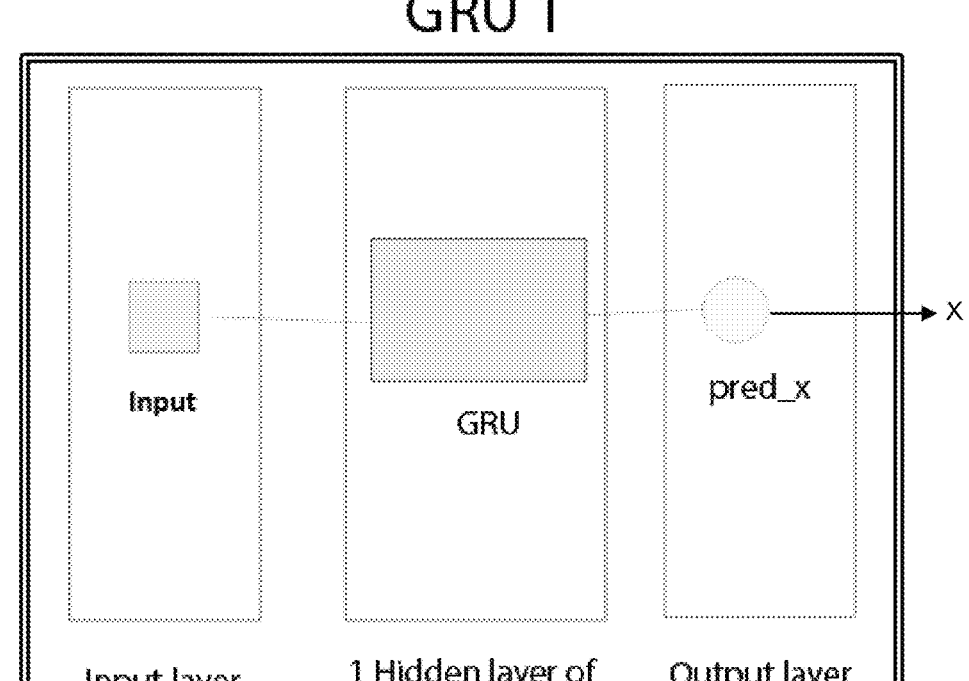
FIG. 11A shows a block-diagram of a neural network proposed by the present invention, using a hidden layer with a single GRU unit configured for determining a 1D position. The GRU unit receives at least 4 magnetic sensor signals as input, and optionally also a temperature signal.
FIG. 11B is a table showing a typical number of trainable parameters for a 1D position sensor circuit comprising a single GRU unit (e.g.

FIG. 11A shows a block-diagram of a trained artificial neural network ANN 1110 proposed by the present invention, as may be used in a magnetic position sensor system having only 1 degree of freedom, e.g. as illustrated in FIG. 1, FIG. 4A and FIG. 4B, and FIG. 7, or variants thereof, e.g. comprising another kind of magnet, or wherein the path of relative movement is curved, etc.

This ANN has an input layer, a single hidden layer comprising a single GRU-component, and an output layer.

The input layer is configured for receiving a plurality of magnetic sensor signals (e.g. h1, h2, h3, h4), and optionally also a temperature signal, for example from a front end block 403 (see FIG. 4A and FIG. 4B), and optionally also "additional signals" such as pairwise differences, a gradient, a ratio, etc. for example from a pre-processing block 730 (see FIG. 7).

For a 1D position sensor system, the output is only a single position, e.g. a value X.

The GRU is trained for determining a 1D position, e.g. a value of a position x along an X-axis, using training data, e.g. any of the training data described in FIG. 5A to FIG. 6C, or combinations thereof.

FIG. 11B is a table showing a typical number of trainable parameters for a 1D position sensor system comprising a single GRU (e.g. as illustrated in FIG. 11A), depending on the number of input signals. The number of trainable parameters may increase if "additional signals" are added.

During the experiments, a particular GRU component was used from a particular vendor, for which the number of trainable parameters N of a single GRU layer can be calculated in accordance with the following formula: $N=3$ $(n^2+n*m+2n)$, where m is the number of inputs, n is the number of outputs. The output of the GRU layer equals the number of units. The output of the GRU layer is also attached to the output layer, which is a dense layer with its own parameters. A dense layer is sometimes also called a "fully-connected" layer. As an example, if the NN needs to estimate one variable (e.g. x) based on the signals obtained from four magnetic sensors (m=4), the number of trainable parameters for the GRU layer is $N=3*(1+4+2)=3*7=21$. For a network with a single output, the output layer may e.g. have 2 additional parameters, thus 23 trainable parameters in total. If the NN also uses the temperature as an input, then n=1, m=5, and $N=3*(1+5+2)=3*8=24$ for the GRU layer, and assuming 2 parameters for the dense layer, yields 26 trainable parameters in total. If the NN gets 4 magnetic sensor signals, and 1 temperature signal, and three "additional signals" (e.g. two two gradients, and a ratio of these gradients) as inputs, then n=1, m=8, and $N=3*(1+8+2)$ $=3*11=33$ for the GRU layer. Assuming the output layer has 2 additional parameters, that means $33+2=35$ trainable parameters in total.

This number may be slightly different for GRU components obtained from another supplier, and therefore should be used only as an estimate. Whatever the exact number, it came as a total surprise that an artificial neural network with a number of parameters smaller than 300, or smaller than 250, or smaller than 200, or smaller than 150, or smaller than 100, or smaller than 75, or smaller than 50, or smaller than 40, or smaller than 35, or smaller than 30 can provide very accurate results.

According to the simulation results, the mean absolute error (MAE) for the 1D position sensor system of FIG. 1A, comprising a two-pole magnet having a length of approx. 5 mm, and comprising a sensor device having a die size area in the range from about 0.25 mm$^2$ to about 1.0 mm$^2$, and having at least 2 or at least 4 horizontal Hall elements, and having a neural network architecture as shown in FIG. 11A, is only about 0.02 to about 0.08 mm, for a measurement range from −2.5 mm to +2.5 mm, i.e. an absolute accuracy in the order of about 0.4% to about 1.6%.

It came as a surprise that such a good accuracy can be reached with such an extremely simple neural network, having much less than a thousand trainable parameters, e.g. less than 300 trainable parameters, or even less than 100 parameters. It is almost unbelievable that a sensor device having only four sensor elements in combination with an ANN having only a single GRU, can do the job with only about 20 to 25 trainable parameters.

It is noted that the ANN can be executed very fast. As an example, during an experiment, it required only about 0.716 ms to execute an ANN of FIG. 11A with 23 trainable parameters, on a laptop having an intel core i7-8750H running at a speed of 4.1 GHz, completely in software. This number should only be used as a rough estimate, to get an impression of the order of magnitude.

It is expected that performing the same (or a similar) algorithm on a fast digital signal processor (DSP), optionally with at least some hardware acceleration (analog or digital) will also be sufficiently fast for many applications.

Figure 12:
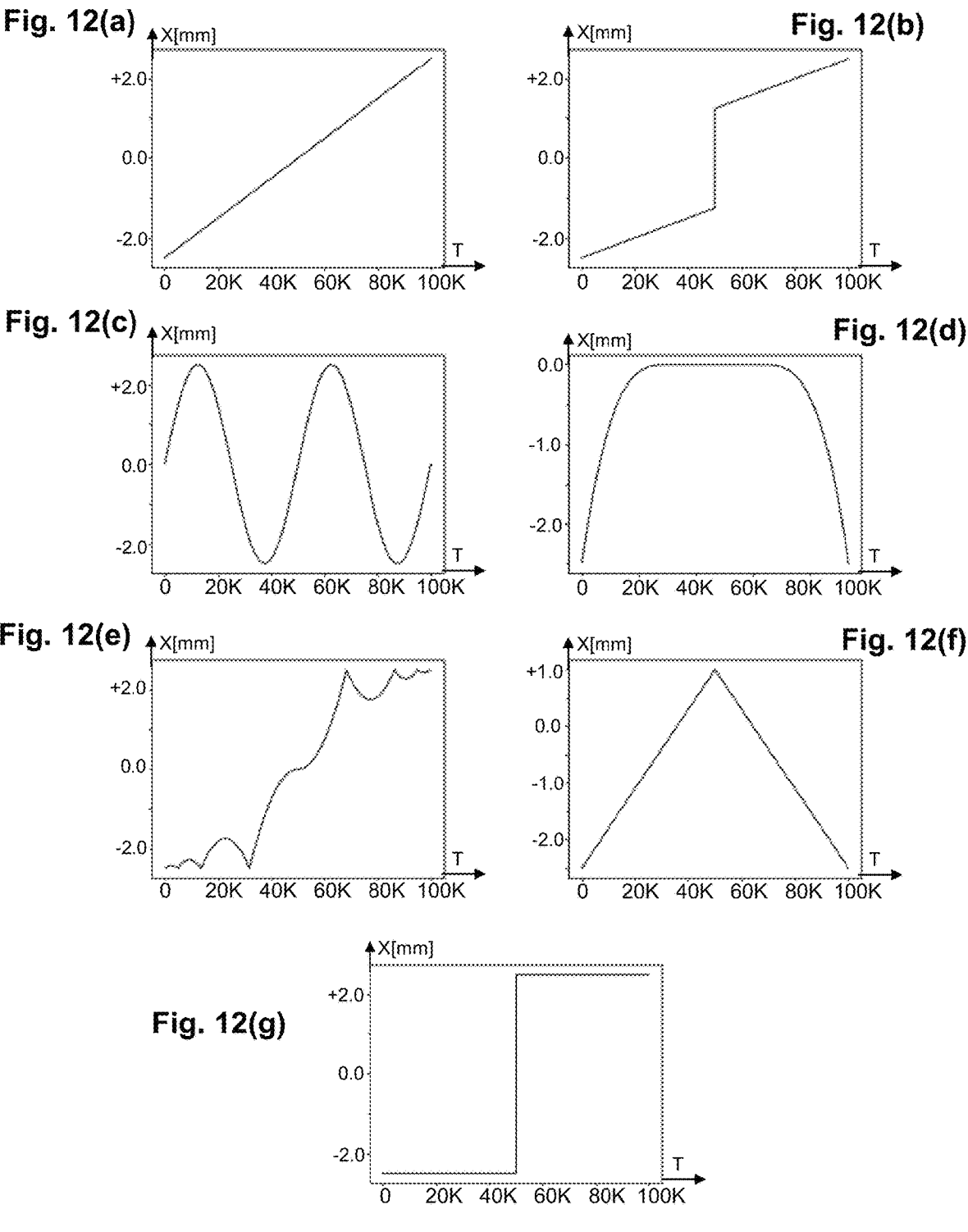
FIG. 12, including FIGS. 12(*a*) to 12(*g*), shows examples of frame sequences which can be used to train the neural network of a 1D position sensor system.

FIG. 12 show examples of "frame sequences" which can be used to train the neural network of a 1D position sensor system. These sequences were already discussed above in relation to FIG. 5A to FIG. 5F. The illustrative sequences shown in FIG. 12(a) to FIG. 12(g), are referred to herein as: (a) "constant speed", (b) "teleport", (c) "sine", (d) "flat top", (e) "bouncing", (f) "sharp top", and (g) "step" respectively. What was not yet discussed above and came as another big surprise is that simulation experiments have shown that the position predicted by the ANN was highly accurate, even when the sensor device performed movements quite different from any of those shown in FIG. 12(a) to FIG. 12(g), for which the network was not explicitly trained.

Figures 13A, 13B:
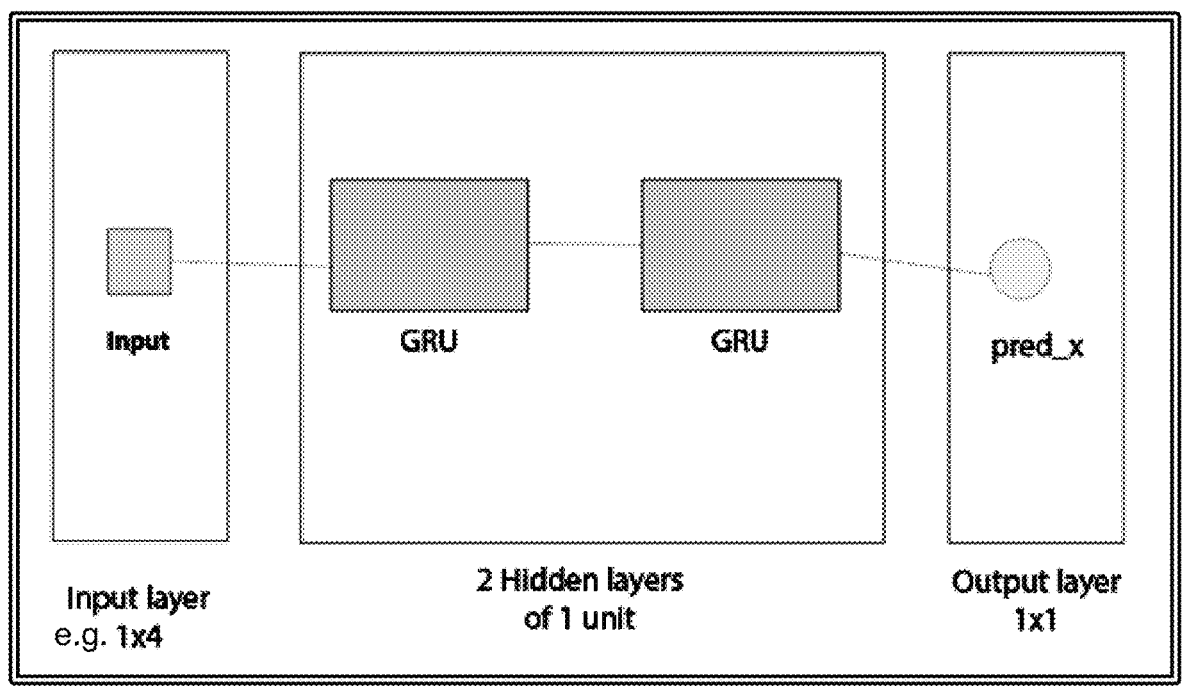
FIG. 13A shows a block-diagram of another neural network trained for estimating a 1D position, comprising only two GRU-units, as can be used in embodiments of the present invention.
FIG. 13B shows a typical number of trainable parameters for examples of such a network.
Figures 14A, 14B:
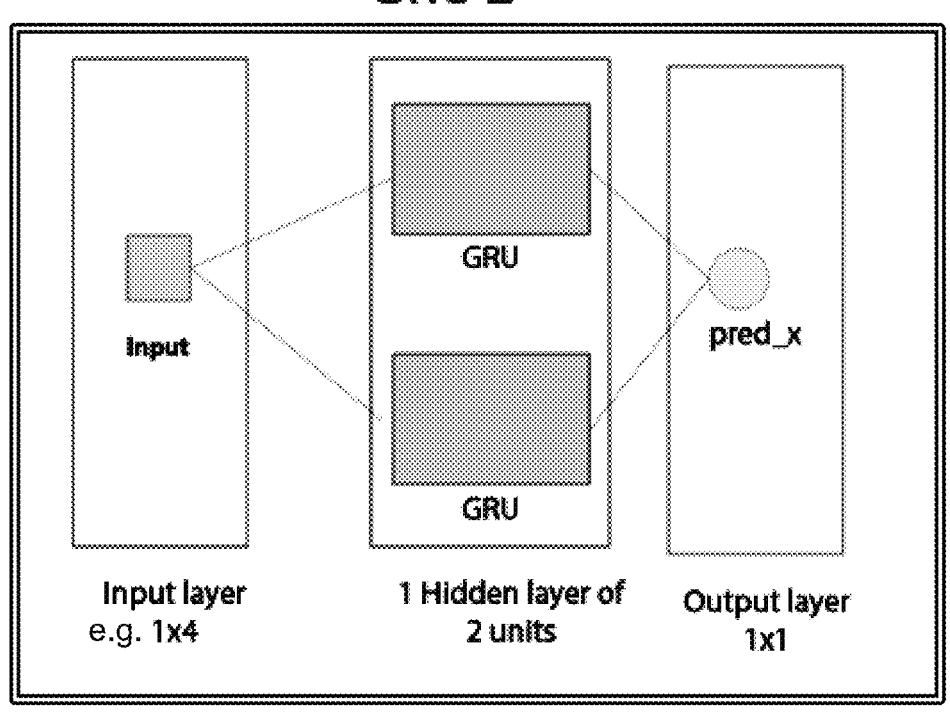
FIG. 14A shows a block-diagram of another neural network trained for estimating a 1D position, comprising only two GRU-units, as can be used in embodiments of the present invention.
FIG. 14B shows a typical number of trainable parameters for examples of such a network.
Figures 15A, 15B:
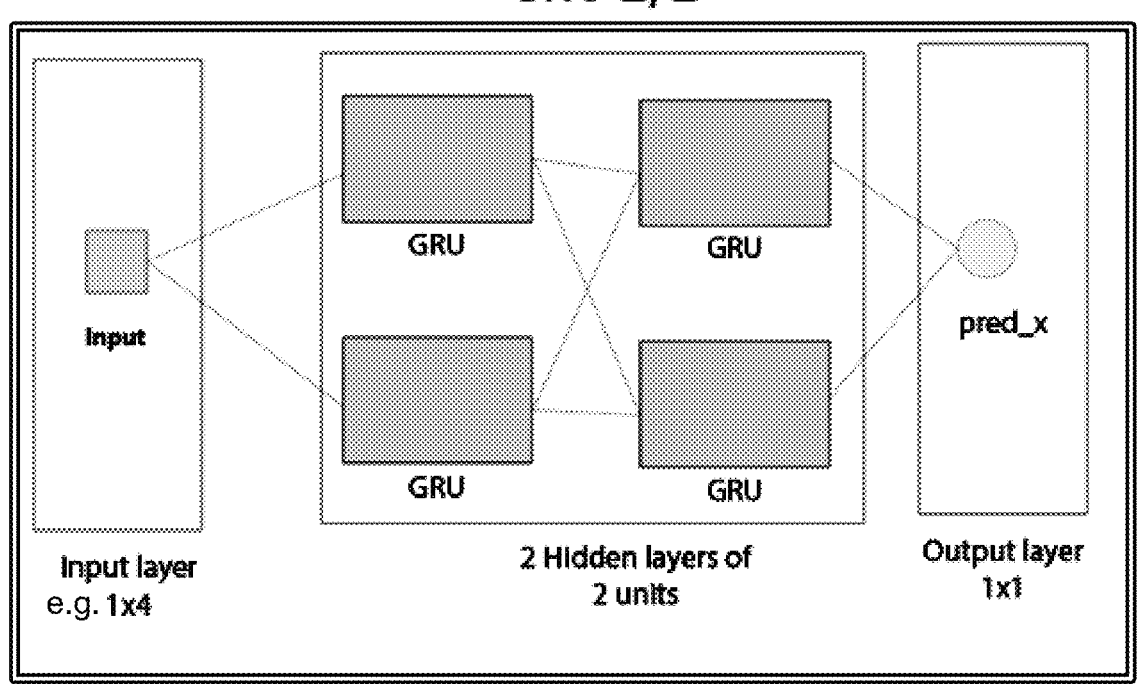
FIG. 15A shows a block-diagram of another neural network trained for estimating a 1D position, comprising only four GRU-units, as can be used in embodiments of the present invention.
FIG. 15B shows a typical number of trainable parameters for examples of such a network.

FIG. 13A, FIG. 14A and FIG. 15A show three block-diagrams of other trained artificial neural networks (ANN) 1310, 1410, 1510 as may be used in a magnetic position sensor system having only 1 degree of freedom, e.g. as illustrated in FIG. 1, FIG. 4A and FIG. 4B, and FIG. 7, or variants thereof, e.g. comprising another kind of magnet, and/or wherein the path of relative movement is curved, etc.

Each of these neural networks 1310, 1410, 1510 of FIG. 13A to FIG. 15 can be seen as a variant of the ANN 1110 of FIG. 11A, the main difference being that these ANN comprise 2 GRU or 4 GRU components instead of only one. While the number of trainable parameters of these networks is higher than that of FIG. 11B, these networks are thus more powerful, and should be able to provide at least equally good results, maybe slightly better.

FIG. 13B, FIG. 14B and FIG. 15B show a typical number of trainable parameters for these networks, depending on the number of input signals, but of course, the present invention is not limited to these examples.

FIG. 16 is a perspective view of a position sensor system 1600 having two degrees of freedom (DOF). The system 1600 comprises a magnet 1601 for generating a magnetic field, and a sensor device 1602 for sensing the magnetic field using a plurality of magnetic sensors.

The 2D-position sensor system 1600 can be seen as a variant of the 1D-position sensor system 100 of FIG. 1, the main difference being that:

1) the magnet 1601 of FIG. 16 can move in a plane parallel to the XY-plane;

2) the position is defined by two independent variables, e.g. X and Y, hence the output layer of the ANN needs to provide 2 independent outputs;

3) the ANN needs to be trained "for determined a 2D position";

4) the sensor device comprises at least 4 sensor elements, which may be, but are preferably not collinear (see FIG. 21 versus FIG. 22);

5) the ANN of the 2D position sensor system may be trained in stateful mode, and inference can be done in stateful mode. In contrast, the 1D neural network may be trained in stateless mode, and inference can be done in stateful mode.

Most or everything else described above is also applicable here, mutatis mutandis.

For example, the block-diagram of FIG. 4A, FIG. 4B, and FIG. 7 are also applicable for a 2D position sensor system; Since the sensor device 1602 comprises at least four sensor elements, the sensor arrangement of FIG. 8A cannot be used, but those of FIG. 8B to FIG. 8F can be used.

Suitable trajectories for creating training data will be described in FIG. 17. Illustrative network-topologies will be described in FIG. 18 and FIG. 20. An example of achievable accuracy will be illustrated in FIG. 19. The number of trainable parameters and corresponding achievable accuracy will be described in FIG. 21 and FIG. 22 for a sensor having only four sensor elements.

In preferred embodiments of the 2D-position sensor system, the movement is a "pure translation" without a rotation. While not absolutely required, preferably the magnet 1601 is a four-pole magnet, e.g. an axially magnetized four pole disk magnet.

Figure 17:
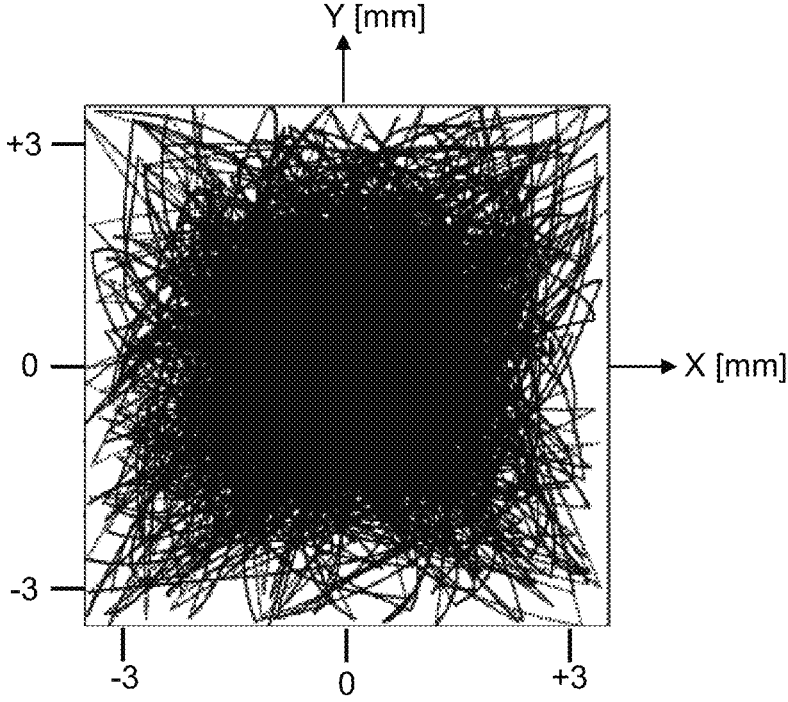
FIG. 17 shows a plurality of 512 Bezier curves, which may be used for training a neural network for determining a 2D position.

FIG. 17 shows a plurality of 512 Bezier curves, which may be used as "trajectories" for creating "training data" for training the neural network for determining a 2D position. Indeed, where a single "trajectory" suffices for a 1D position sensors system, typically a relatively large number of trajectories is used (in the example of FIG. 17: 512 trajectories) for training a 2D position sensors system.

Much of what has been described above in FIG. 5A to 6C is also applicable here, e.g. that each trajectory may have a number of sub-trajectories for coping with external disturbance field, and/or temperature variations, and/or noise, except that the trajectories of a 2D position sensor system should vary the values of x and y over the measurement range, rather than keeping one of them constant. As can be seen in FIG. 17, the variables of x and y are varied over an area covering at least the measurement range, defined as a square region in which both variables x and y can range from −2.5 to +2.5 mm.

It is noted that other trajectories can of course also be used, optionally in combination with Bezier curves, for example a set of trajectories parallel to the X-axis, a set of trajectories parallel to the Y-axis, a set of trajectories forming an angle of about 10° with the X-axis, a set of trajectories forming an angle of about 20° with the X-axis, etc.

Similar as described in FIG. 5A to FIG. 5F, the training data can be provided by a simulation tool, which would not only take the value of X as an input, but also a value of Y, and optionally also a value of an external disturbance field, a temperature, and noise. Similar as described in FIG. 6A to FIG. 6C, the training data may also be provided by physically moving a magnet relative to a sensor device, and capturing the sensed data, or by positioning the sensor device in a test-device referred to as a "3D coil system", where a magnetic field is generated for each of the sensor positions, by controlling currents flowing through the coils, in order to emulate the magnetic field that the sensors of the sensor device would see if it would be physically moved relative to a permanent magnet.

Similar considerations as described above (following FIG. 6C), regarding the number of sensor devices that will be used for acquiring raw measurement data, comprising a semiconductor substrate portion obtained from several semiconductor wafers and/or obtained from several locations on the semiconductor wafers are also applicable here.

Figures 18A, 18B:
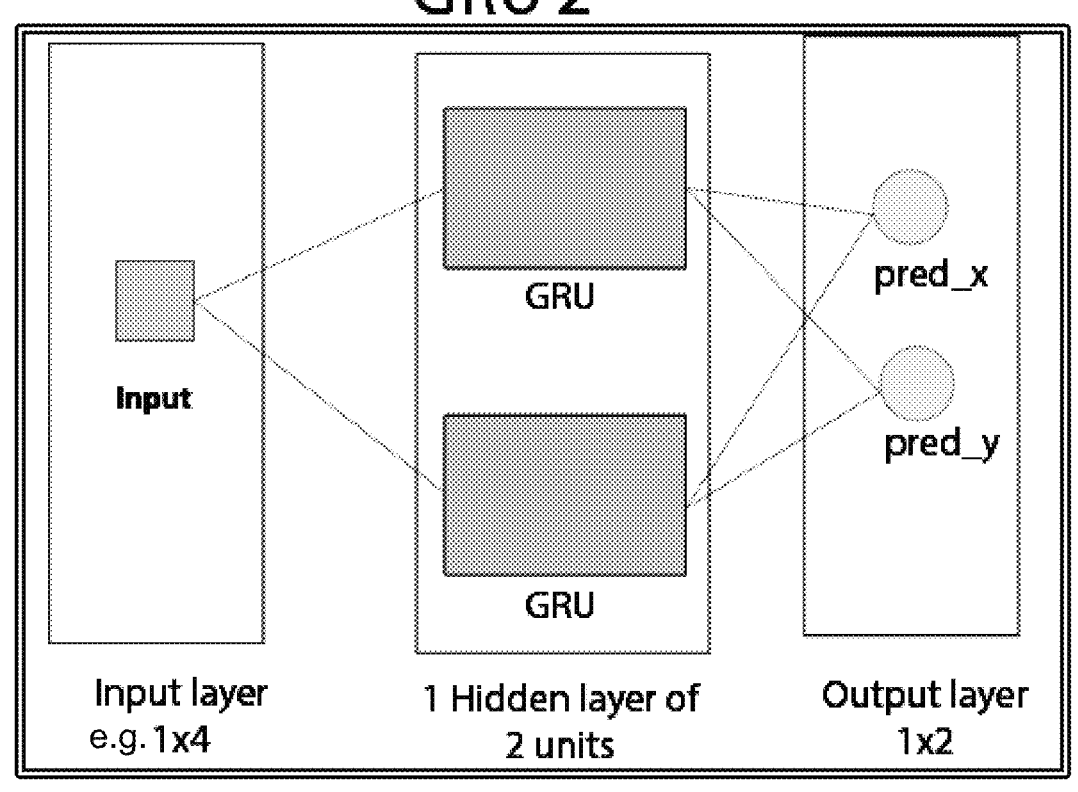
FIG. 18A shows a recurrent neural network proposed by the present invention for estimating a 2D position of a sensor arrangement, e.g.
FIG. 18B shows a typical number of trainable parameters for examples of such a network.

FIG. 18A shows a block-diagram of a trained artificial neural network ANN 1810 proposed by the present invention, as may be used in a magnetic position sensor system 1600 having only 2 degrees of freedom, e.g. as illustrated in FIG. 16, or variants thereof, e.g. comprising another kind of magnet, or as illustrated in FIG. 25 or FIG. 26.

The ANN 1810 has an input layer, a single hidden layer comprising two GRU-components, and an output layer.

The input layer is configured for receiving a plurality of magnetic sensor signals (e.g. h1, h2, h3, h4), and optionally also a temperature signal, for example from a front end block 403 (see FIG. 4A and FIG. 4B), and optionally also "additional signals" such as pairwise differences, a gradient, a ratio, etc. for example from a pre-processing block 730 (see FIG. 7).

The output layer needs to provide two independent output values, e.g. x and y.

The two GRU's are trained for determining a 2D position, using training data as described above (in relation to FIG. 17).

FIG. 18B shows a typical number of trainable parameters for this network, depending on the number of input signals, but of course, the present invention is not limited to these examples.

Figure 19:
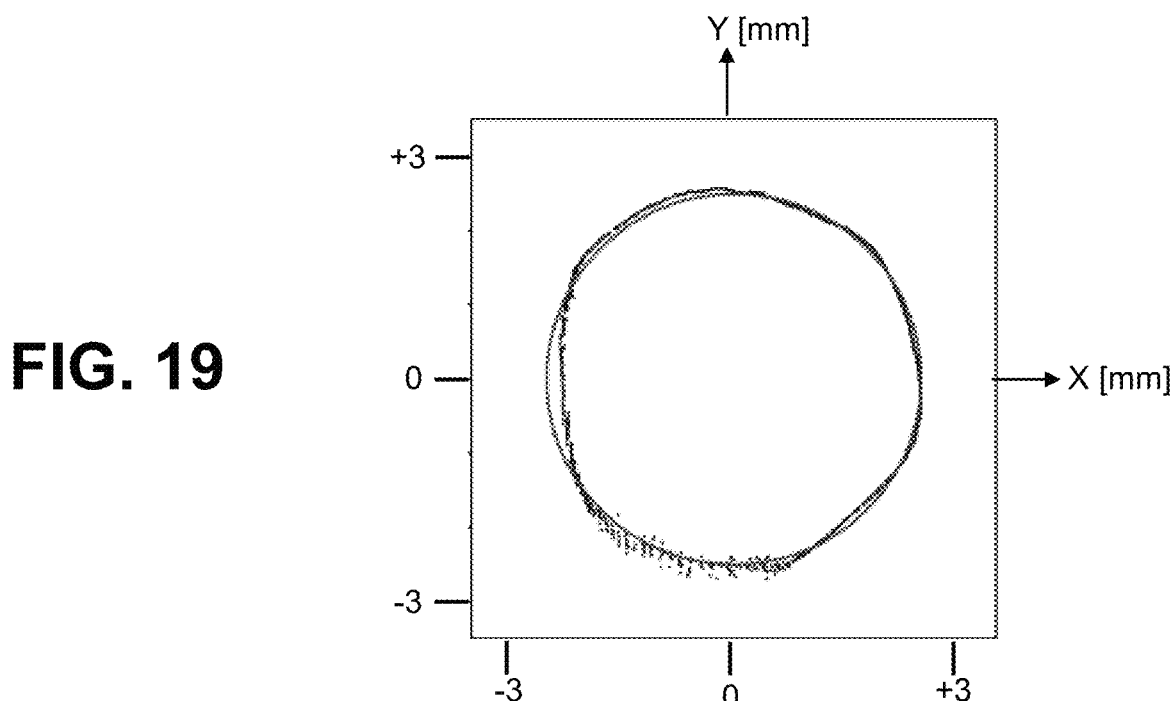
FIG. 19 shows an example of the resulting predictions of the neural network shown in FIG. 18, trained using the 512 trajectories shown in FIG. 17.

FIG. 19 shows an example of resulting predictions of a neural network having a topology as shown in FIG. 18, which was trained using the 512 trajectories shown in FIG. 17. The ideal position is shown by a circle having a radius of 2.5 mm; the positions estimated by the ANN 1810 are indicated by dots close to the circle. As can be seen, the absolute error for this example is about 0.3 mm, which is about 12% of the measurement range. This ANN has two GRUs, each GRU unit having only 25 trainable parameters, the total network having 54 trainable parameters in total, and has an MSE of 0.0143 on average.

Figures 20A, 20B:
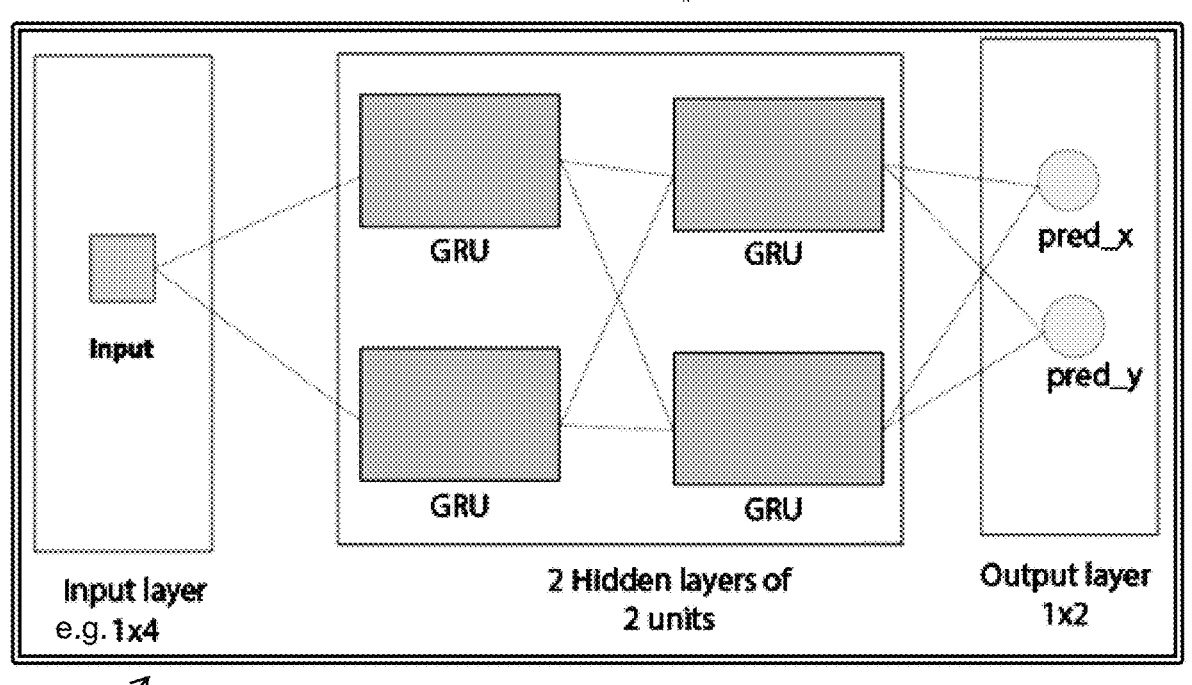
FIG. 20A shows a block-diagram of another recurrent neural network proposed by the present invention for estimating a 2D position of a sensor arrangement, e.g.
FIG. 20B shows a typical number of trainable parameters for examples of such a network.

FIG. 20A shows a block-diagram of another recurrent neural network 2010 proposed by the present invention for estimating a 2D position of a position sensor system, e.g. as shown in FIG. 16. This network can be seen as a variant of the network 1810 of FIG. 18, having the same input layer and the same output layer, but having two hidden layers, each having two GRU units, thus four GRU units in total.

FIG. 20B shows a typical number of trainable parameters for this network, depending on the number of input signals, but of course, the present invention is not limited to these examples.

FIG. 21 is a table showing the number of trainable parameters for a 2D position sensor system comprising a two-pole magnet and a sensor device having four magnetic sensors arranged on a straight line (e.g. as illustrated in FIG. 8C), and having at least two GRU units organized in one or more GRU layers each having one or more GRU units, and an estimate of the resulting accuracy in terms of MSE in mm.

As can be seen, the MSE for these sensor systems is about 0.23 to 0.39 mm, which is about 10% of the measurement range. This table shows that using a sensor arrangement with four sensor collinear elements, in combination with the two-pole magnet of FIG. 16, does not lead to highly accurate results, irrespective of the number of GRU units used. But of course, if an accuracy of about 12% is good enough for certain applications, then a simple ANN having a single layer with 2 GRU units (as illustrated in FIG. 18), the single layer having 54 parameters, can be used (first row of FIG. 21).

FIG. 22 is a table showing the number of trainable parameters for a 2D position sensor system comprising a two-pole magnet 1601 and a sensor device 1602 having four magnetic sensors arranged on a regular 2×2 grid (e.g. as illustrated in FIG. 8D), and having one or more layers, each having one or more GRU units, and an estimate of the resulting accuracy (in terms of MSE in mm).

As can be seen, the MSE for these sensor systems is about 0.28 mm, which is about 12% of the measurement range, when using an ANN having a single hidden layer with only 1 GRU-unit, e.g. as shown in FIG. 18. Comparison with the table of FIG. 21 shows that locating the four sensors on a grid does not really help to improve the accuracy, if the ANN contains only 1 GRU unit.

However, when the ANN contains one hidden layer with at least two GRU units, the MSE drops to a value of at most 0.0143, which is smaller than 0.3% of the measurement range. The result for 2 layers with 2 GRU units is 0.0091. As can be seen, the MSE can be further decreased by a factor of about 3, but at the expense of using more GRU units and a larger number of trainable parameters.

The best trade-off between accuracy versus complexity seems to be the solution provided on the second row of this table, namely an ANN architecture as illustrated in FIG. 18, requiring only 54 parameters in total. But of course, the present invention is not limited thereto, and other solutions will also work, for example an ANN having two or more hidden layers, each having at least two GRU units. And of course, solutions with more than four sensor elements will also work.

Figure 23:
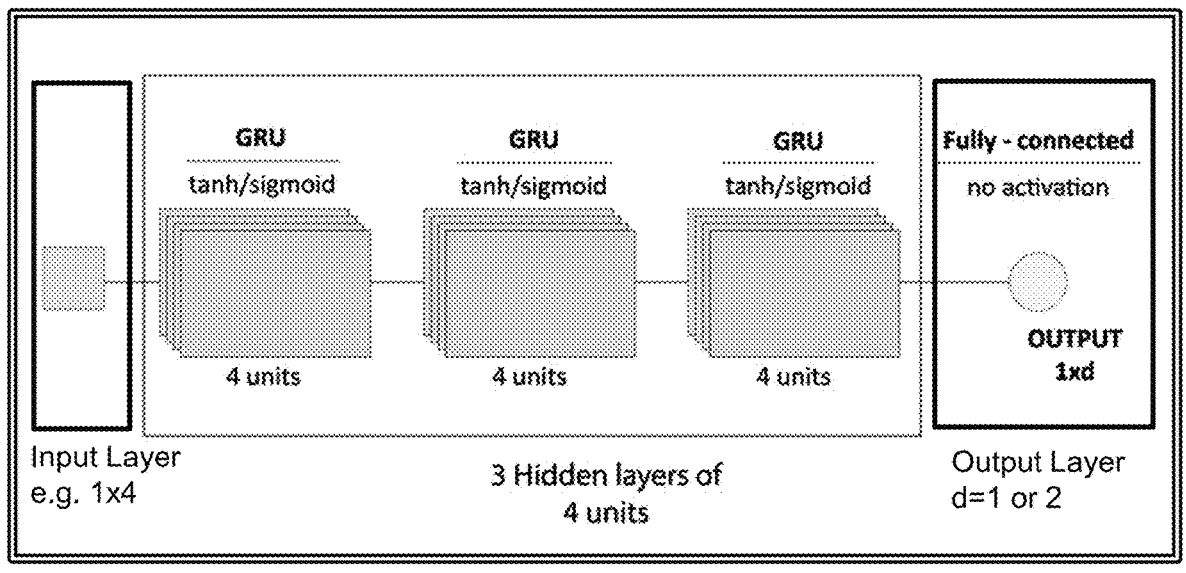
FIG. 23 shows a block-diagram of another recurrent neural network as may be used for estimating a 1D or 2D or 3D position of a sensor arrangement, e.g.

FIG. 23 shows a block-diagram of another recurrent neural network 2310 as may be used for estimating a 1D or 2D or 3D position of a sensor arrangement, e.g. as shown in FIG. 1, FIG. 16, FIG. 25 or FIG. 26, but not limited thereto. The network has three hidden layers, each comprising four GRU units, thus twelve GRU units in total. FIG. 10B and FIG. 10C show some performance characteristics of these networks.

FIG. 24 show a flow-chart of a method 2400 for determining a position (e.g. a 1D position or a 2D or a 3D position) of a sensor device 102, 1602, 2502, 2602 which is movable relative to a magnetic source 101, 1601, 2501, 2601 or vice versa, with only 1 or only 2 or only 3 degrees of freedom, e.g. a 1D movement along a straight line or along a curved path, or a 2D movement in a plane, or a 3D movement in 3 directions, e.g. a pure translation without a rotation, or two rotations without a translation (as in FIG. 25 or FIG. 26). The method comprises the following steps:

a) obtaining 2402 a plurality of sensor signals from a plurality of magnetic sensors;

b) determining 2405 the position of the sensor device relative to the magnetic source based on said plurality of magnetic sensor signals and/or signals derived therefrom (referred to as "additional signals"), wherein the position is determined using an artificial neural network (ANN), wherein the artificial neural network is a recurrent neural network trained for determining said position, wherein the ANN has at most 300 trainable parameters per degree of freedom (thus at most 300 trainable parameters for a system having only 1 degree of freedom, and at most 600 trainable parameters parameters for a system having only 2 degrees of freedom, and at most 900 trainable parameters for a system having only 3 degrees of freedom).

In a variant of the method, the sensor device may further comprise a temperature sensor, and the ANN may further take into account the measured temperature.

FIG. 25 is a perspective view of an illustrative position sensor system 2500 having two degrees of freedom, where a permanent magnet 2501 is mounted to a joystick, which is movable back/forth and left/right relative to a sensor device 2502 about a reference point Pref located on the semiconductor substrate that contains a plurality of magnetic sensor elements.

In the example shown, the magnet 2501 is an axially magnetized cylindrical magnet, but the present invention is not limited thereto, and other magnets can also be used.

The 2D position of the joystick may be defined by two angular values $\varphi$, $\psi$, or by two coordinates X, Y (e.g. the coordinates of the end of the joystick in the XY-plane), or two angles $\alpha$, $\beta$ as defined in FIG. 2 of EP4105768(A1), which document is incorporated herein by reference.

The sensor device 2502 may comprise an architecture as illustrated in FIG. 4A, or as illustrated in FIG. 4B. The sensor device comprises a plurality of magnetic sensor elements or magnetic sensor structures, e.g. a plurality of horizontal Hall elements, or 2D magnetic pixels (e.g. comprising an IMC and 2 horizontal Hall elements; or comprising 2 vertical Hall elements; or comprising MR elements), or 3D magnetic pixels (e.g. comprising an IMC and 4 horizontal Hall elements). In particular embodiments, the sensor device comprises only horizontal Hall elements without IMC.

The sensor device 2502 comprises a recurrent neural network (ANN) with at most 2*300=600 trainable parameters in total, but as can be appreciated from FIG. 31, the number of trainable parameters can be much, much lower, e.g. at most 400 or at most 300 or at most 200 or at most 100, depending on the number of inputs supplied to the ANN. The ANN may have for example a GRU2 architecture (see e.g. FIG. 14A), or an SRNN2 architecture (similar to GRU2 but using two SRNN units instead of two GRU-units), or an SRNN3 architecture (having a single hidden layer with three SRNN units), or an SRNN4 architecture (having a hidden layer with four SRNN units), but the present invention is not limited thereto, and a recurrent neural network using LSTM units instead of GRU units or SRNN units may also be used.

FIG. 26 is a perspective view of an illustrative position sensor system 2600 having two degrees of freedom, where a magnet is mounted to a joystick, which is movable back/forth and left/right relative to a sensor device about a reference point located above the semiconductor substrate. The sensor system 2600 is a variant of the sensor system 2500 of FIG. 25, and everything mentioned for the system of FIG. 25 is also applicable here.

Figures 27, 28:
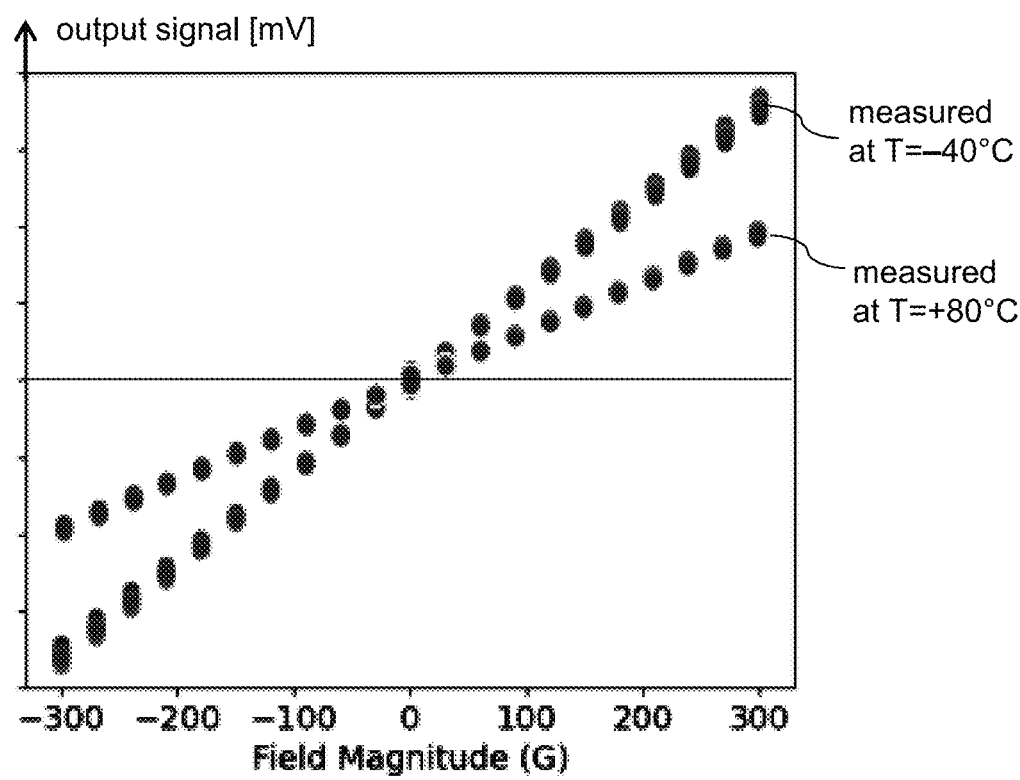
FIG. 27 is a graph showing raw output signals of Horizontal Hall elements (in arbitrary units) for various magnitudes of a magnetic field, at a temperature of −40° C. and at +80° C.
FIG. 28 shows a table illustrating the accuracy of the 1D positioning system of FIG. 11A (GRU1 architecture) using 4 input signals (4 magnetic signals) or 5 input signals (4 magnetic signals and temperature).

FIG. 27 is a graph showing real world measurements obtained from Horizontal Hall elements (shown in arbitrary units) for various magnitudes of a magnetic field, measured at a temperature of −40° C. and at +80° C. As can be seen, the amplitude of the signals provided by horizontal Hall elements is highly dependent on temperature. Indeed, the signal amplitude almost doubles if the temperature of the substrate decreases from +80° C. to −40° C.

While it is technically possible to correct the sensitivity of the Hall elements in the front-end block 403 (see FIG. 4A and FIG. 4B), preferred embodiments of the present invention do not perform a temperature correction of the signals in the front-end block, but measure the temperature of the semiconductor substrate, digitize this signal, and feed it as an additional input to the ANN. It is noted that it suffices to measure the temperature at only one location of the semiconductor substrate, and it is not required, for example, to measure the temperature of each Hall element separately. In this way the number of input signals applied to the ANN can be dramatically reduced, and the complexity of the network can be kept small.

FIG. 28 shows a table illustrating the accuracy of the 1D positioning system of FIG. 11A (GRU1 architecture) using 4 input signals (4 magnetic signals) or 5 input signals (4 magnetic signals and temperature). As can be appreciated, the mean square error (MSE) is dramatically improved (decreased), in the example by a factor of 5, when the temperature is measured and input to the ANN as an extra input signal. While not explicitly shown in FIG. 28, the same effect (of improved accuracy if a temperature signal is input into the NN, while the number of trainable parameters is only marginally increased, is also achieved in the other neural network architectures mentioned in this application.

FIG. 29 shows a table with a typical number of trainable parameters for a 1D positioning system using a recurrent neural network having 5 input signals (4 magnetic signals and temperature) for various architectures. As can be seen, the number of trainable parameters required for these architectures is only about 9 to 31, which is extremely low, especially as compared to other systems requiring thousands of trainable parameters to reach a decent accuracy.

FIG. 30 shows a typical accuracy of these systems. As can be seen, the accuracy of a GRU1 architecture is quite good, but the accuracy of a SRNN2 architecture is even six times better, while the number of trainable parameters is reduced from 26 to 19. This was totally unexpected. As can be seen, the accuracy can be further improved by a factor of about 2.0, by using an SRNN3 architecture, which is still an extremely simple neural network architecture with a very small number of trainable parameters (e.g. far less than 100).

FIG. 31 shows a table with a typical number of trainable parameters for a 2D positioning system using (a) a sensor device having four 1D magnetic pixels (each configured for providing a Bz signal) and a temperature sensor, or (b) using a sensor device having four 2D magnetic pixels (each configured for providing an in-plane component and an out-of-plane component) and a temperature sensor. As can be seen, the number of trainable parameters required for these architectures is only about 22 to about 84, which is extremely low, especially as compared to other systems requiring thousands of trainable parameters to reach a decent accuracy.

FIG. 32 shows a typical accuracy of these systems. As can be seen, the accuracy of a GRU2 architecture is quite good, but the accuracy of a SRNN3 architecture is approximately the same, while the number of trainable parameters is reduced by almost a factor of 2. As can be seen, the accuracy can be improved by a factor of about 2.0, by using an SRNN4 architecture, which is still a relatively simple neural network architecture with a small number of trainable parameters (far less than 100).

Figures 33A, 33B:
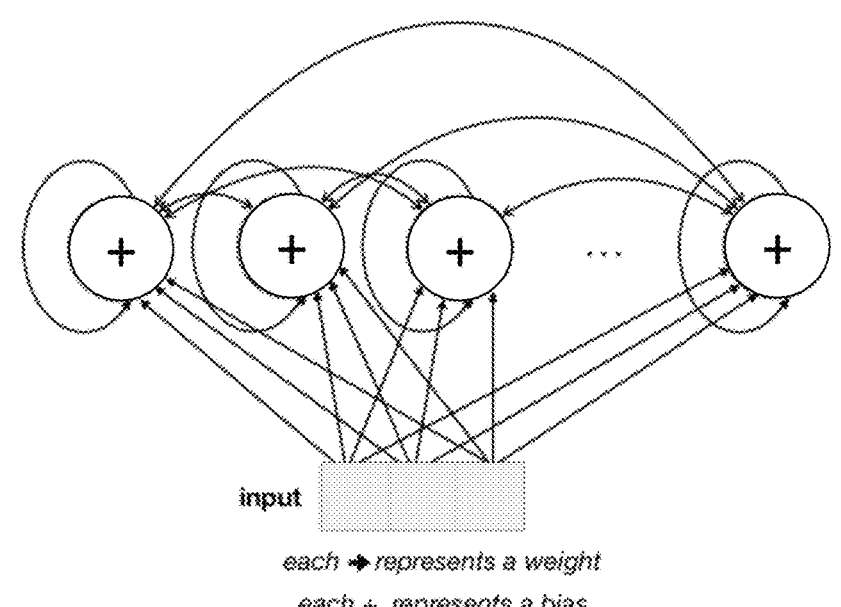
FIG. 33A and FIG. 33B are illustrative examples of simple neural networks.

FIG. 33A is an illustrative example of a "simple neural network". The network may have only a single hidden layer. The units of this layer are SRNN units (simple RNN units). All of these units are interconnected, they have 1 arrow going to each other unit, including one arrow feeding back into itself. Each arrow represents a weight. Each "+" represents a bias.

FIG. 33B is a schematic representation of an RNN3 network, i.e. a simple recurrent network having a single hidden layer with only 3 SRNN units.

While not explicitly shown, the present invention will also work with recurrent neural networks comprising only LSTM units.

While no explicit examples are given for a system with 3 degrees of freedom, the skilled person, having the benefit of the present disclosure, can use the same principles as described above for a system having 1 degree of freedom, or having 2 degrees of freedom, in particular for a 3D position system wherein the magnet is translatable relative to the sensor device (or vice versa), and wherein the position can be determined by three independent displacement values (x,y,z).

The invention claimed is:

1. A method of determining a position of a sensor device, wherein the sensor device is movable relative to a magnetic source with 1 or 3 mechanical degrees of freedom, or vice versa;

the sensor device comprising a semiconductor substrate comprising a plurality of at least two magnetic sensors situated in at least two different locations;

the method comprising the steps of:

a) obtaining a plurality of sensor signals from said plurality of magnetic sensors;

b) determining the position of the sensor device relative to the magnetic source based on said plurality of magnetic sensor signals and/or signals derived therefrom;

wherein step b) comprises determining said position using an artificial neural network;

wherein the artificial neural network is a recurrent neural network having a predefined number of trainable parameters, which are trained for determining said position; and wherein the number of trainable parameters is at most 300 per mechanical degree of freedom.

2. The method according to claim 1, wherein the recurrent neural network is a stateful recurrent network.

3. The method according to claim 1, wherein the semiconductor substrate comprises at least three or only three magnetic sensors situated in at least three different locations; or wherein the semiconductor substrate comprises at least four or only four magnetic sensors situated in at least four different locations; or wherein the semiconductor substrate comprises a two-dimensional array or a two-dimensional arrangement of magnetic sensors.

4. The method according to claim 1, wherein the sensor device furthermore comprises a temperature sensor, and wherein step a) further comprises: measuring a temperature of the semiconductor substrate using said temperature sensor, and providing the measured temperature as an input to the neural network; and wherein step b) comprises: determining the position of the sensor device relative to the magnetic source based on said plurality of magnetic sensor signals and based on the measured temperature signal.

5. The method according to claim 1, wherein the neural network is trained for estimating the position using training data obtained from or derived from simulation data provided by computer simulations and/or obtained from or derived from measurement data provided by actual measurements.

6. The method according to claim 5, wherein the simulation data and/or the measurement data is interpolated to increase the spatial resolution at least by a factor of 2.

7. The method according to claim 5, wherein at least some or all of the actual measurements are performed by physically moving a sensor device relative to a magnetic source, or vice versa.

8. The method according to claim 5, wherein at least some or all of the actual measurements are performed by generating a magnetic field using a test device comprising at least one coil, and by causing at least one current to flow through said at least one coil.

9. The method according to claim 5, wherein artificial noise is added to the training data; and/or wherein a magnetic disturbance field is added to the training data; and/or wherein a mounting offset is added to the training data.

10. The method according to claim 5, wherein the training data comprises measurement data provided by actual measurements performed on at least 3 different sensor devices;

wherein each of these at least 3 different sensor devices comprise a semiconductor substrate obtained from at least three different semiconductor wafers.

11. The method according to claim 1, wherein the sensor device is movable relative to the magnetic source or vice versa with only 2 mechanical degrees of freedom, and wherein the training data comprises at least four trajectories for approaching various measurement positions of a measurement range in at least four different directions; or wherein the sensor device is movable relative to the magnetic source or vice versa with only 3 mechanical degrees of freedom, and wherein the training data comprises at least eight trajectories for approaching various measurement positions of a measurement range in at least eight different directions.

12. The method according to claim 1, wherein step b) further comprises determining one or more additional signals, in one or more of the following ways: by determining one or more pairwise differences, by determining one or more magnetic field gradients, by determining at least one average signal and by subtracting this average signal from at least two measured signals, by normalizing the signals, by calculating a ratio of two measured signals, by calculating a ratio of two pairwise differences, by calculating a ratio of two gradients, and feeding at least one of these additional signals into the neural network; and wherein the neural network is trained for estimating the position using training data derived from computer simulations and/or actual measurements and trained with one or more of these additional signals.

13. The method according to claim 1, wherein the recurrent neural network comprises at most twelve Gated Recurrent Units (GRU); or wherein the neural network comprises at most twelve simple RNN units (SRNN); or wherein the neural network comprises at most twelve LSTM units.

14. A position sensor system comprising:

a magnetic source;

a sensor device comprising a semiconductor substrate comprising a plurality of at least two magnetic sensors situated in at least two different locations;

a processing circuit configured for performing a method according to claim 1.

15. The position sensor system according to claim 14, wherein the sensor device is movable relative to the magnetic source with only 2 mechanical degrees of freedom, and wherein the sensor device comprises 4 to 25 magnetic sensors, and wherein the sensor device or the magnetic source is movable in two directions in a virtual plane or over a virtual surface, and wherein the number of trainable parameters is at most 300.

16. The position sensor system according to claim 14, wherein the movement of the sensor device relative to the magnetic source is a combination of a translation and a rotation, but the rotation is dependent on the translation.

17. The position sensor system according to claim 14, wherein a mean square error (MSE) of the position determined by the artificial neural network is smaller than 2% of the predefined measurement range.

18. The position sensor system according to claim 14, wherein the semiconductor substrate comprising the plurality of magnetic sensors has a size of at most 3.0 mm×3.0 mm; and/or wherein the processing circuit comprises a programmable processor having a 32 bit CPU core and a floating point unit (FPU), configured to run at an internal clock frequency of at most 400 MHz, and comprises at most 2 Mbytes of flash and at most 512 Kbytes of RAM, wherein the artificial neural network is implemented in software configured to be executed by said programmable processor.

19. The position sensor system according to claim 14, wherein the semiconductor substrate contains 4 to 25 horizontal Hall elements; and wherein all of the magnetic sensor elements are Horizontal Hall elements.

20. A position sensor device comprising:

a semiconductor substrate comprising at least two magnetic sensors spaced apart from each other, and configured for providing at least two magnetic sensor signals;

a processing circuit configured for performing a method according to claim 1.

* * * * *